US009544911B2

(12) United States Patent
Liu et al.

(10) Patent No.: US 9,544,911 B2
(45) Date of Patent: Jan. 10, 2017

(54) SYSTEM AND METHOD FOR ASSIGNING COMMUNICATIONS RESOURCES IN A WIRELESS COMMUNICATIONS SYSTEM

(75) Inventors: Juejun Liu, Shenzhen (CN); ZhengChuang Ming, Guangzhou (CN); Sean Michael McBeath, Keller, TX (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1823 days.

(21) Appl. No.: 12/188,075

(22) Filed: Aug. 7, 2008

(65) Prior Publication Data
US 2009/0042581 A1 Feb. 12, 2009

Related U.S. Application Data

(60) Provisional application No. 60/955,183, filed on Aug. 10, 2007.

(51) Int. Cl.
*H04W 72/10* (2009.01)
*H04L 5/00* (2006.01)

(52) U.S. Cl.
CPC ............ *H04W 72/10* (2013.01); *H04L 5/0007* (2013.01); *H04L 5/0092* (2013.01); *H04L 5/0037* (2013.01); *H04L 5/0053* (2013.01)

(58) Field of Classification Search
USPC .......... 370/328–330, 315, 338; 455/446–453
See application file for complete search history.

(56) References Cited

U.S. PATENT DOCUMENTS 6,351,459 B1  2/2002 Kondo
6,377,572 B1  4/2002 Dolan et al.
(Continued)

FOREIGN PATENT DOCUMENTS

CN  1219306 A  6/1999
CN  1360446 A  7/2002
(Continued)

OTHER PUBLICATIONS

"Medium Access Control Layer for Ultra Mobile Broadband (UMB) Air Interface Specification," $3^{rd}$ Generation Partnership Project 2, 3GPP2 C.S0084-002-0, Version 2.0, Aug. 2007, 314 pages, Third Generation Partnership Project 2 (3GPP2), Arlington, VA.

(Continued)

Primary Examiner — Marcos Torres
(74) Attorney, Agent, or Firm — Slater Matsil, LLP

(57) ABSTRACT

System and method for assigning communications resources in a wireless communications system. A method for operating a base station comprises receiving a resource request for radio resources for a mobile station, in response to a determining that the base station will service the resource request, assigning radio resources based on the resource request and transmitting an indicator of the assigned radio resources to the mobile station, and in response to a determining that the base station will not service the resource request, returning to a normal mode of operations. The assigning of radio requests makes use of a channel tree comprised of two non-orthogonal sets of mappings between nodes of the channel tree and radio resources, with each node corresponding to at least one radio resource.

27 Claims, 17 Drawing Sheets

(56) References Cited

U.S. PATENT DOCUMENTS

| | | | |
|---|---|---|---|
| 6,404,325 | B1 | 6/2002 | Heinrich et al. |
| 6,597,919 | B1 | 7/2003 | Kumar et al. |
| 6,907,246 | B2* | 6/2005 | Xu et al. .................. 455/447 |
| 7,116,240 | B2 | 10/2006 | Hyde |
| 7,215,251 | B2 | 5/2007 | Hyde |
| 7,706,323 | B2 | 4/2010 | Stopler et al. |
| 2002/0082021 | A1 | 6/2002 | Chen et al. |
| 2003/0221012 | A1 | 11/2003 | Herrmann et al. |
| 2004/0145454 | A1 | 7/2004 | Powell et al. |
| 2005/0201269 | A1 | 9/2005 | Shim et al. |
| 2005/0233754 | A1 | 10/2005 | Beale |
| 2005/0281228 | A1 | 12/2005 | Oh et al. |
| 2006/0039274 | A1 | 2/2006 | Park et al. |
| 2006/0109865 | A1 | 5/2006 | Park et al. |
| 2006/0133312 | A1 | 6/2006 | Harrison Teague et al. |
| 2006/0209754 | A1* | 9/2006 | Ji et al. .................. 370/329 |
| 2006/0293076 | A1 | 12/2006 | Julian et al. |
| 2007/0058523 | A1 | 3/2007 | Cho et al. |
| 2007/0060178 | A1 | 3/2007 | Gorokhov et al. |
| 2007/0076670 | A1 | 4/2007 | Kuchibhotla et al. |
| 2007/0097910 | A1 | 5/2007 | Ji et al. |
| 2007/0129708 | A1 | 6/2007 | Edwards et al. |
| 2007/0206561 | A1 | 9/2007 | Son et al. |
| 2007/0217370 | A1 | 9/2007 | Soong et al. |
| 2007/0230412 | A1 | 10/2007 | McBeath et al. |
| 2007/0274288 | A1 | 11/2007 | Smith et al. |
| 2007/0275728 | A1 | 11/2007 | Lohr et al. |
| 2007/0286066 | A1 | 12/2007 | Zhang et al. |
| 2007/0291708 | A1 | 12/2007 | Rao |
| 2008/0004029 | A1 | 1/2008 | Moilanen |
| 2008/0025247 | A1 | 1/2008 | McBeath et al. |
| 2008/0025337 | A1 | 1/2008 | Smith et al. |
| 2008/0034274 | A1 | 2/2008 | Song et al. |
| 2008/0037496 | A1 | 2/2008 | Smith et al. |
| 2008/0062936 | A1 | 3/2008 | He et al. |
| 2008/0062944 | A1 | 3/2008 | Smith et al. |
| 2008/0080422 | A1 | 4/2008 | Frederiksen et al. |
| 2008/0080423 | A1 | 4/2008 | Kolding et al. |
| 2008/0084843 | A1 | 4/2008 | Gorokhov et al. |
| 2008/0146241 | A1 | 6/2008 | Das et al. |
| 2008/0192847 | A1 | 8/2008 | Classon et al. |
| 2008/0240034 | A1 | 10/2008 | Gollamudi |
| 2008/0268785 | A1 | 10/2008 | McCoy |
| 2008/0310363 | A1 | 12/2008 | McBeath |
| 2009/0022098 | A1 | 1/2009 | Novak et al. |
| 2009/0029710 | A1 | 1/2009 | Ochiai et al. |
| 2009/0047912 | A1 | 2/2009 | Lee et al. |
| 2009/0070650 | A1 | 3/2009 | Bourlas et al. |
| 2009/0075667 | A1 | 3/2009 | Bourlas |

FOREIGN PATENT DOCUMENTS

| | | |
|---|---|---|
| CN | 1115899 C | 7/2003 |
| CN | 1536794 A | 10/2004 |
| CN | 1728695 A | 2/2006 |
| CN | 1780188 A | 5/2006 |
| CN | 1968452 A | 5/2007 |
| CN | 1968453 A | 5/2007 |
| CN | 101031130 A | 9/2007 |
| CN | 101102142 A | 1/2008 |
| EP | 1 786 220 A1 | 5/2007 |
| WO | WO 98/37706 | 8/1998 |
| WO | WO 2006/001658 A1 | 1/2006 |
| WO | WO 2006/096887 A1 | 9/2006 |
| WO | WO 2008/099577 A1 | 9/2006 |
| WO | WO 2006/113873 A2 | 10/2006 |
| WO | WO 2006/137708 A1 | 12/2006 |
| WO | WO 2007/033997 A1 | 3/2007 |
| WO | WO 2009/067955 A1 | 6/2009 |

OTHER PUBLICATIONS

McBeath, S., et al., "Efficient Signaling for VoIP in OFDMA," 2007 Wireless Communications and Networking Conference, Mar. 11-15, 2007, 6 pages, IEEE.

McBeath, S., et al., "Efficient Bitmap Signaling fo VoIP in OFDMA," 2007 Vehicular Technology Conference, Sep. 30-Oct. 3, 2007, 5 pages, IEEE.

Bourlas, Y., et al., "Persistent Allocation Updated Procedures," IEEE 802.16 Broadband Wireless Access Working Group, IEEE P802.16Rev2/D4, Apr. 19, 2008, pp. 1-50, IEEE.

Written Opinion of the International Searching Authority, App. No. PCT/CN2008/071325, Date of mailing: Sep. 18, 2008, 5 pages.

Written Opinion of the International Searching Authority, App. No. PCT/CN2008/071317, Date of mailing: Sep. 18, 2008, 4 pages.

First Chinese Office Action, Chinese Application No. 200880001172.3, Dated: Jul. 1, 2010, 6 pages.

Second Chinese Office Action, Chinese Application No. 200880001172.3, Dated: Feb. 28, 2011, 9 pages.

Third Chinese Office Action, Chinese Application No. 200880001172.3, Jun. 15, 2011, 9 pages.

"Text Proposal for Downlink OFDMA Resource Allocation and Mapping Rules for Distributed Mode Users in E-UTRA, with Discussion on Control Information," 3GPP TSG RAN WG1 #45, R1-061149, May 8-12, 2006, pp. 1-8.

Classon, B.K., et al., U.S. Appl. No. 60/888,833, filed Feb. 8, 2007, the specification and drawings, 40 pages.

"Technical Specification Group Radio Access Network; Physical Layer Aspects for Evolved UTRA (Release 7)," $3^{rd}$ Generation Project, 3GPP TR 25.814, V1.3.1, May 2006, pp. 6-11.

International Search Report and Written Opinion received in PCT Application No. PCT/CN2008/071316, mailed Sep. 25, 2008, 13 pages.

First Chinese Office Action and Translation received in Chinese Patent Application No. 200880100578.7, mailed Mar. 16, 2012, 22 pages.

First Chinese Office Action and Partial Translation received in Chinese Application No. 200880001601.7, mailed Apr. 25, 2012, 11 pages.

"Part 16: Air Interface for Fixed Broadband Wireless Access Systems," Air Interface for Fixed Broadband Wireless Access Systems, IEEE P802, 16-REVd.D5, May 2004, pp. 7-12.

Written Opinion of the International Searching Authority, received in PCT Application No. PCT/CN2008/071943, mailed Nov. 20, 2008, 5 pages.

Written Opinion of the International Searching Authority, received in PCT Application No. PCT/CN2008/073221, mailed Mar. 5, 2009, 3 pages.

International Search Report of the International Searching Authority received in PCT Application No. PCT/CN2008/073221, mailed Mar. 5, 2009, 2 pages.

Second Office Action with partial English translation received in Chinese Application No. 200880100578.7, mailed Dec. 5, 2012, 29 pages.

Third Chinese Office Action with Partial English translation received in Chinese Application No. 200880100578.7 mailed May 3, 2013, 17 pages.

\* cited by examiner

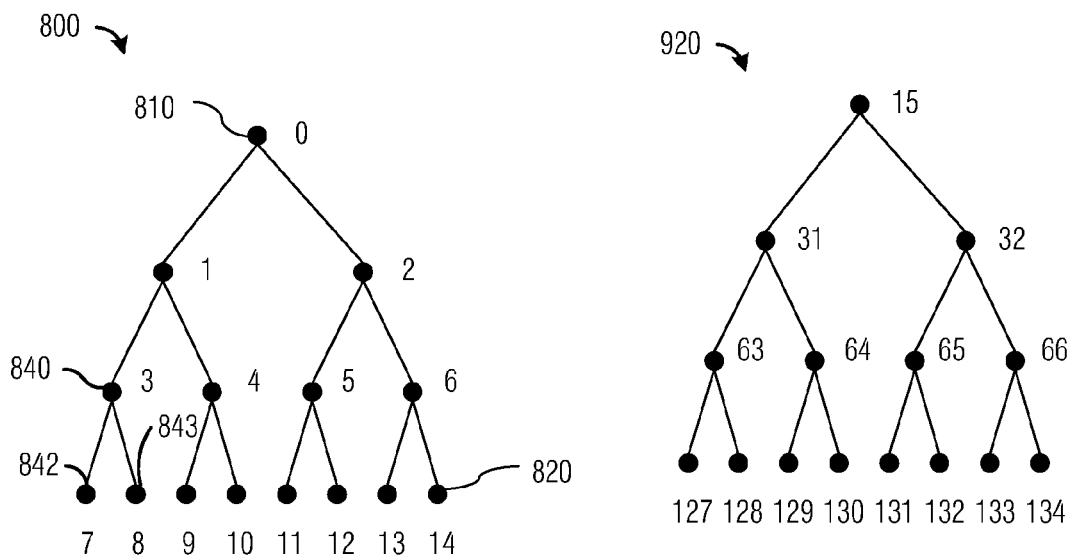
*Fig. 8*
*Fig. 10*
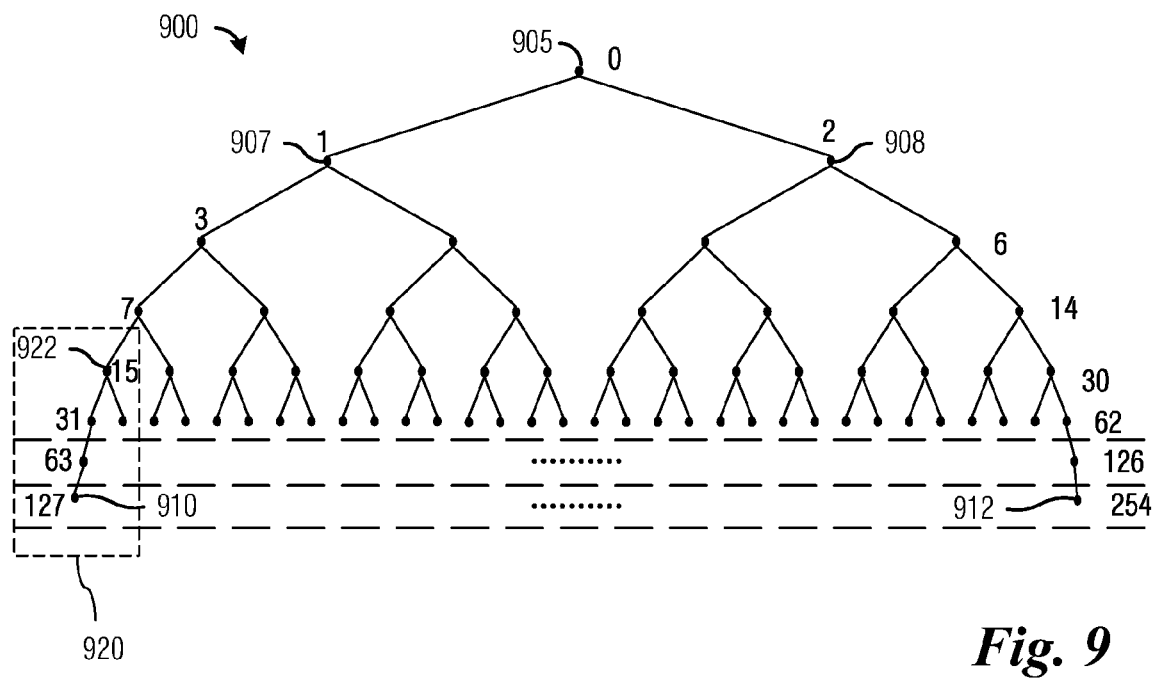
*Fig. 9*

SYSTEM AND METHOD FOR ASSIGNING COMMUNICATIONS RESOURCES IN A WIRELESS COMMUNICATIONS SYSTEM

CROSS-REFERENCE TO RELATED APPLICATIONS

This application claims the benefit of U.S. Provisional Application No. 60/955,183, filed Aug. 10, 2007, entitled "Method and Apparatus for Flexibly Assigning Resources in a Wireless System," which application is hereby incorporated herein by reference.

This application is related to the following co-assigned patent application: Ser. No. 12/135,599, filed Jun. 6, 2008, entitled "Method and Apparatus for Assigning Resources in a Wireless System," which application is hereby incorporated herein by reference.

TECHNICAL FIELD

The present invention relates generally to a system and method for wireless communications, and more particularly to a system and method for assigning communications resources in a wireless communications system.

BACKGROUND

In orthogonal frequency division multiplexing (OFDM) and orthogonal frequency division multiple access (OFDMA) communications systems, time-frequency resources may be shared among a number of mobile stations (MS). A base station (BS) may assign the time-frequency resources to an MS using an assignment message, which may be transmitted as part of a control channel. Ideally, information regarding an assignment of the time-frequency resources to an MS may be transmitted to the MS using as little control channel overhead (for example, fewest bits of information) as possible, while maintaining as much assignment flexibility as possible.

In a commonly used technique to minimize control channel overhead, the BS may transmit the time-frequency resource assignment in the form of an index to a channel tree. The channel tree may include channel tree nodes, wherein each channel tree node may correspond to a specific portion of the time-frequency resources of the OFDMA communications system. In general, the structure of the channel tree may dictate the permissible assignments of the time-frequency resources. For example, if there are eight time-frequency resources that may be assigned and if the channel tree has the structure of a binary tree, then an assignment may be transmitted using four bits of information.

In an alternate approach to assigning the time-frequency resources, the BS may transmit a bitmap to the MS, wherein each bit of the bitmap may represent a time-frequency resource that may be assigned and the value of the bit may represent the time-frequency resources assigned to the MS. For example, if there are eight time-frequency resources that may be assigned, then an assignment may be transmitted using eight bits of information, with one bit per time-frequency resource. Additionally, if a bit in the eight-bit sequence has a value of one (1), then a corresponding time-frequency resource may be assigned to the MS, while if a bit has a value of zero (0), then a corresponding time-frequency resource may not be assigned to the MS.

SUMMARY OF THE INVENTION

These and other problems are generally solved or circumvented, and technical advantages are generally achieved, by embodiments of a system and a method for assigning resources in a wireless communications system.

In accordance with an embodiment, a method for operating a base station of a wireless communications system is provided. The method includes receiving a resource request for radio resources for a mobile station, and in response to a determining that the base station will service the resource request, assigning radio resources based on the resource request, and transmitting an indicator of the assigned radio resources to the mobile station. The assigning makes use of a channel tree comprised of two non-orthogonal sets of mappings between nodes of the channel tree and radio resources, with each node corresponding to at least one radio resource. The method also includes in response to a determining that the base station will not service the resource request, returning to a normal mode of operations.

In accordance with another embodiment, a method for operating a base station of a wireless communications system is provided. The method includes receiving a resource request for radio resources for a mobile station, and in response to a determining that the base station will service the resource request, assigning radio resources based on the resource request, and transmitting an indicator of the assigned radio resources to the mobile station. The assigning makes use of an annular channel tree comprised of an outermost ring having one or more nodes corresponding to allocatable radio resources, at least two rings each having a same number of nodes as the outermost ring, and at least one combining ring having a node that combines nodes from an outer ring in a circularly adjacent manner. The method also includes in response to a determining that the base station will not service the resource request, returning to a normal mode of operations.

In accordance with another embodiment, a method for operating a base station of a wireless communications system is provided. The method includes receiving a resource request for radio resources for a mobile station, and in response to a determining that the base station will service the resource request, determining possible allocatable radio resources based on the resource request, assigning radio resources from the possible allocatable radio resources, updating radio resources information regarding the assigned radio resources, transmitting an indicator of the assigned radio resources to the mobile station. The allocatable radio resources may be based on a channel tree comprised of two non-orthogonal sets of mappings between nodes of the channel tree and radio resources, an annular channel tree comprised of a set of mappings between nodes of the annular channel tree and radio resources, or a multilevel channel tree comprised of a set of mappings between nodes of the multilevel channel tree and radio resources with an allocation specified by a first index corresponding to a node in a first portion of the multilevel channel tree and a second index corresponding to a number of nodes a specified number of levels below the node. The method also includes in response to a determining that the base station will not service the resource request, returning to a normal mode of operations.

In accordance with another embodiment, an electronic device is provided. The electronic device includes a base station that coordinates communications of a mobile station associated with the base station, and a scheduler coupled to the base station. The communications are coordinated using resource requests transmitted to the base station. The scheduler determines allocatable radio resources based on a resource request, assigns radio resources, and updates assigned radio resources. The allocatable radio resources may be based on a channel tree comprised of two non-orthogonal sets of mappings between nodes of the channel tree and radio resources, an annular channel tree comprised of a set of mappings between nodes of the annular channel tree and radio resources, or a multilevel channel tree comprised of a set of mappings between nodes of the multilevel channel tree and radio resources with an allocation specified by a first index corresponding to a node in a first portion of the multilevel channel tree and a second index corresponding to a number of nodes a specified number of levels below the node.

In accordance with another embodiment, a method for operating a base station of a wireless communications system is provided. The method includes receiving a resource request for radio resources for a mobile station, and in response to a determining that the base station will service the resource request, assigning radio resources based on the resource request, and transmitting an indicator of the assigned radio resources to the mobile station. The assigning makes use of a multilevel channel tree comprised of a set of mappings between nodes of the multilevel channel tree and radio resources, with each node corresponding to at least one radio resource, the multilevel channel tree specifiable by a first index corresponding to a node in a first portion of the multilevel channel tree and a second index corresponding to a number of nodes a specified number of levels below the node, wherein the number of levels is dependent on a length of the second index. The method also includes in response to a determining that the base station will not service the resource request, returning to a normal mode of operations.

An advantage of an embodiment is that a higher degree of assignment flexibility may be achieved without incurring significantly increased control channel overhead.

A further advantage of an embodiment is that control channel overhead is kept in check while providing increased assignment flexibility.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 8 is a diagram of a first channel tree;

FIG. 9 is a diagram of a second channel tree;

FIG. 10 is a diagram of a detailed view of a portion of the second channel tree;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an OFDMA wireless communications system. The invention may also be applied, however, to other wireless communications systems, wherein there is a need to transmit resource assignment information, such as code division multiple access (CDMA), time division multiple access (TDMA), and frequency division multiple access (FDMA) wireless communications systems.

Figure 1:
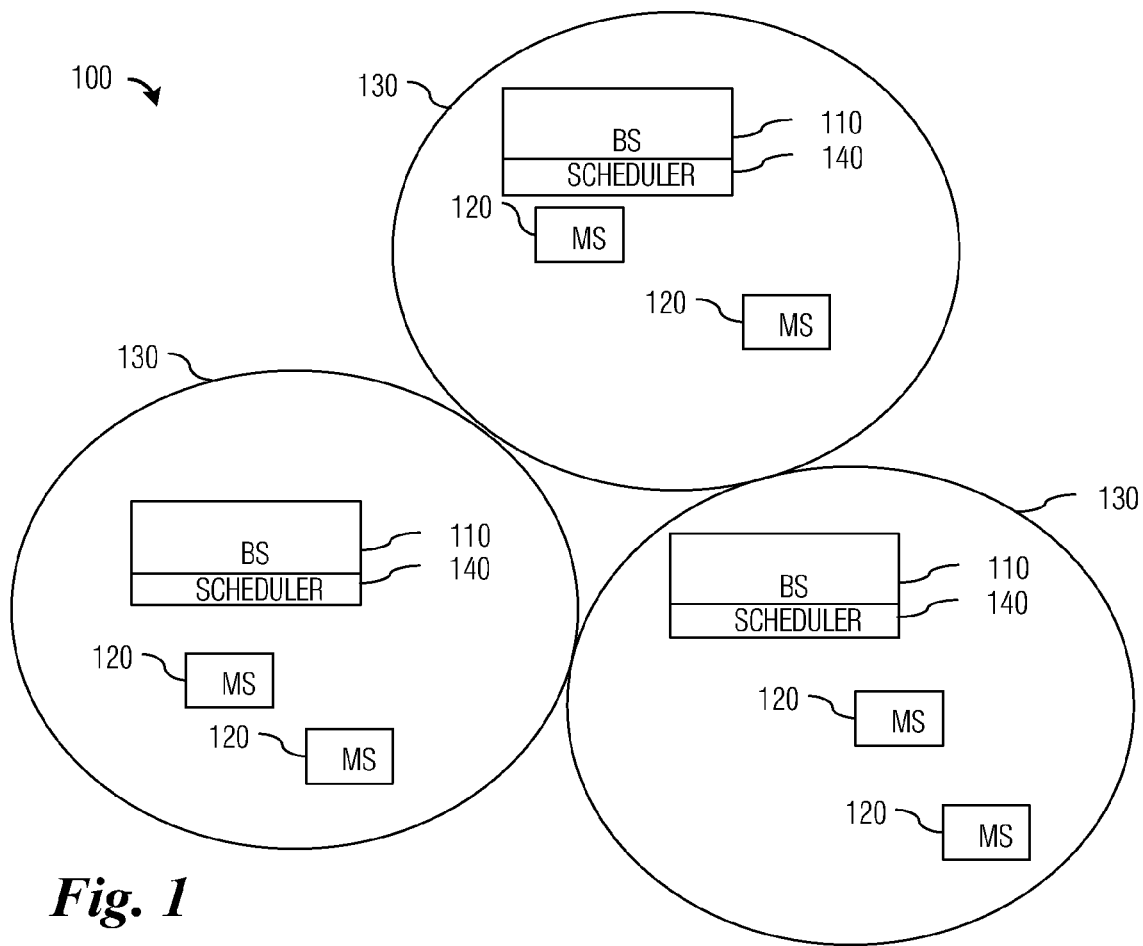
FIG. 1 is a diagram of a wireless communications network.

With reference now to FIG. 1, there is shown a diagram illustrating a wireless communications network 100. The wireless communications network 100 includes a plurality of BS 110 providing voice and/or data wireless communications service to a plurality of MS 120. A BS may also be referred to as an access point (AP), an access network (AN), a Node-B, and so forth. Each BS 110 may have a corresponding coverage area 130. As shown in FIG. 1, each BS 110 includes a scheduler 140 for assigning radio resources to corresponding MS 120.

Exemplary wireless communications systems include Evolved Universal Terrestrial Radio Access (E-UTRA) networks, Ultra Mobile Broadband (UMB) networks, IEEE 802.16 compliant networks, and other OFDMA based networks. For example, the wireless communications network 100 may be a frequency division multiple access (FDMA) network where time-frequency resources may be divided into frequency intervals over time, a time division multiple access (TDMA) network where time-frequency resources may be divided into time intervals over frequency, a code division multiple access (CDMA) network where time-frequency resources may be divided into orthogonal or pseudo-orthogonal codes over time-frequency intervals, or a combination thereof.

Figure 2:
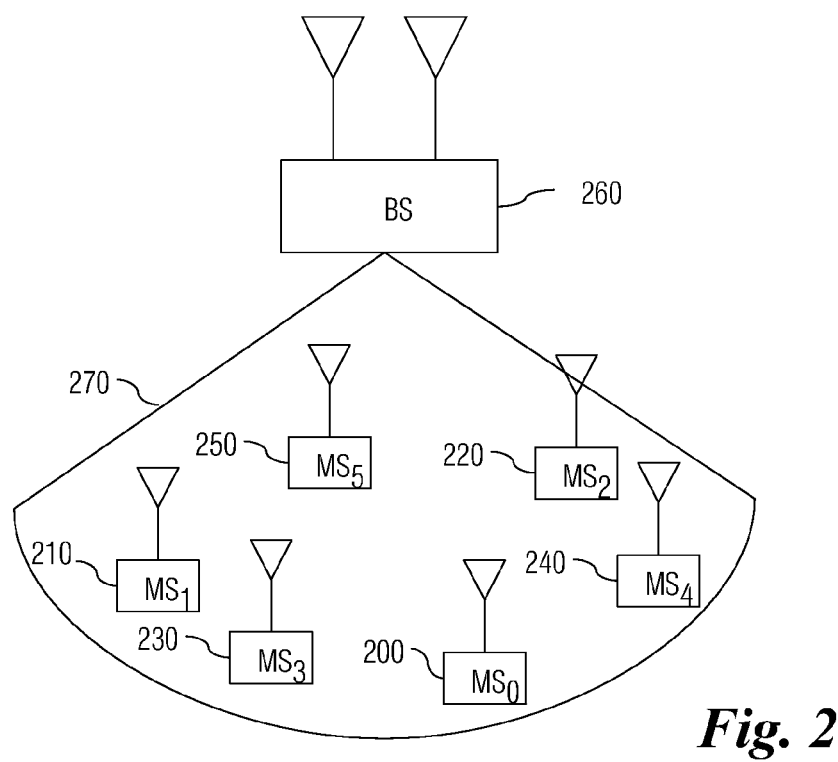
FIG. 2 is a diagram of a base station operation in a wireless communications network along with associated mobile stations.

FIG. 2 illustrates a detailed view of a BS 260 operating in a wireless communications network. In general, the BS 260 may have three coverage areas with coverage area 270 shown in FIG. 2. Six MS 200, 210, 220, 230, 240, and 250 may be operating in the coverage area 270. The BS 260 may assign to each MS (200, 210, 220, 230, 240, and 250) one or more connection identifiers (CID) or some other similar identifier to facilitate time-frequency resource assignment. The CID assignment may be transmitted from the BS 260 to the MS over a control channel. Alternatively, the CID assignment may be permanently stored at the MS or derived based on parameter of the MS or BS 260.

Figure 3:
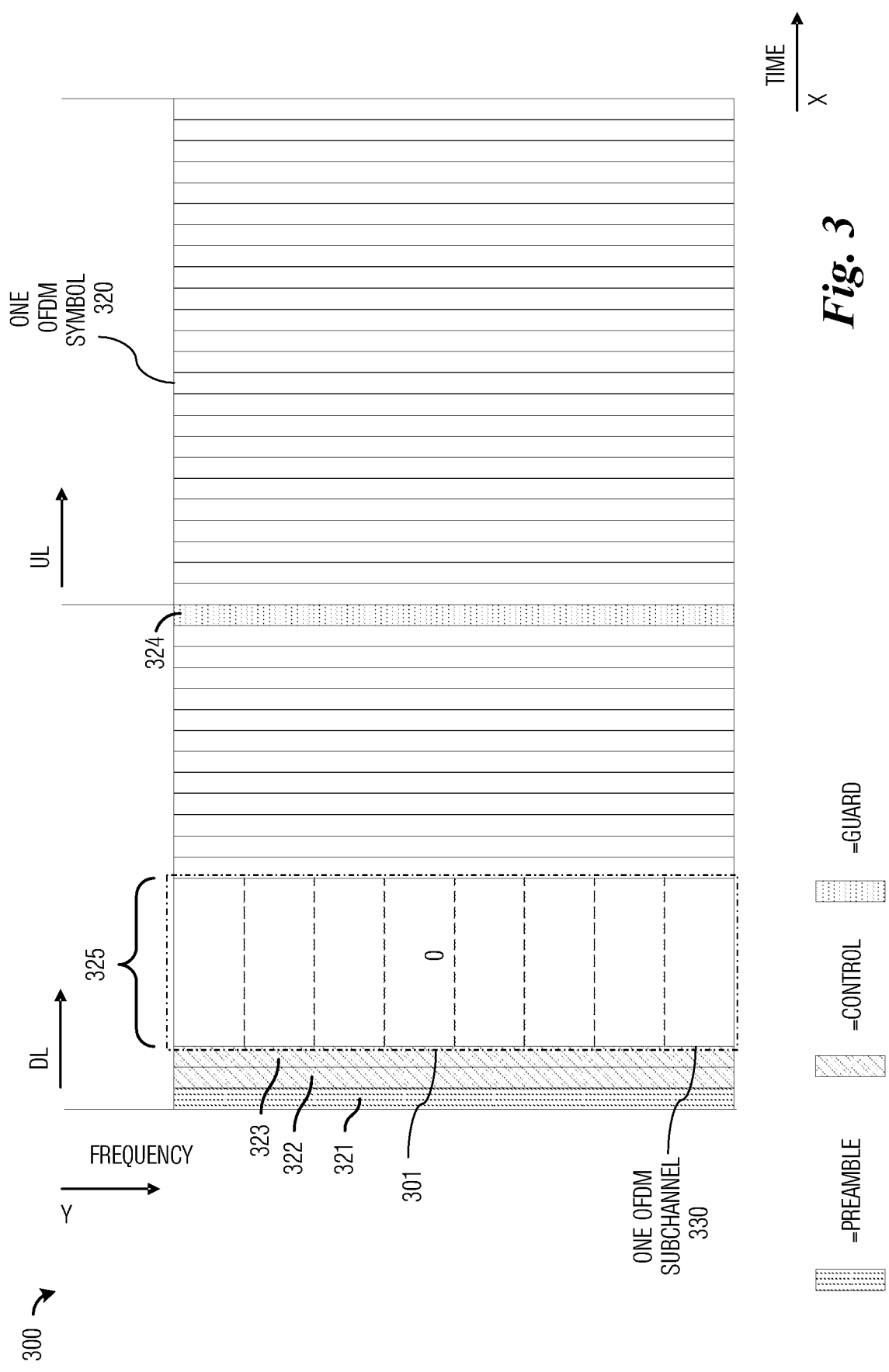
FIG. 3 is a diagram of a set of OFDMA time-frequency resources of an OFDMA frame, showing a first possible region configuration.

FIG. 3 illustrates a view of a set of OFDMA time-frequency resources 300 of an OFDMA frame. In a typical OFDMA communications system, the time-frequency resources may be divided into OFDM symbols and OFDM subcarriers for assignment by a scheduler, such as the scheduler 140 (FIG. 1), for use by MS. In an exemplary OFDMA communications system, OFDM subcarriers may be about 10 kHz apart with a duration of each OFDM symbol being approximately 100 micro-seconds. As shown in FIG. 3, the set of OFDMA time-frequency resources 300 may correspond to a time division duplex (TDD) communications system, such as defined by the IEEE 802.16e standard.

The time domain resources (shown in a horizontal (X) axis) may be divided into two portions, denoted as a downlink (DL) and an uplink (UL). The DL may be used by a BS to transmit information to MS and the UL may be used by MS to transmit information to the BS. The DL and the UL may be further divided into a number of OFDM symbols, such as OFDM symbol 320. As shown in FIG. 3, the DL and the UL are divided into 24 OFDM symbols each.

A first OFDM symbol 321 of the DL may be assigned for use as a preamble, which may be used for timing and frequency synchronization by MS. A second OFDM symbol 322 and a third OFDM symbol 323 may be used to transmit control information. A last OFDM symbol 324 of the DL may be used as a guard period to help prevent interference between the DL and the UL.

Shown in a vertical (Y) axis are frequency domain resources. As shown in FIG. 3, a zone (or region) 325 consisting of a fourth DL OFDM symbol to an eleventh DL OFDM symbol may be divided into a number of OFDM subchannels, such as OFDM subchannel 330. The OFDM subchannel 330 may contain 48 usable OFDM subcarriers that may either be contiguous or distributed across a larger bandwidth. A usable OFDM subcarrier may be a subcarrier that may be used for data transmission, i.e., subcarriers not used for transmitting pilots or training information.

As shown in FIG. 3, the fourth DL OFDM symbol through the eleventh DL OFDM symbol (the zone 325) may be assigned in 15 distinct time-frequency resource assignments. Each distinct time-frequency resource assignment may be referred to as a node and may be given a node number. FIG. 3 illustrates a largest time-frequency resource assignment (shown as highlight 301) and labeled node 0 (zero). Node 0 consists of eight (8) OFDM symbols with 384 usable OFDM subcarriers.

Figure 4:
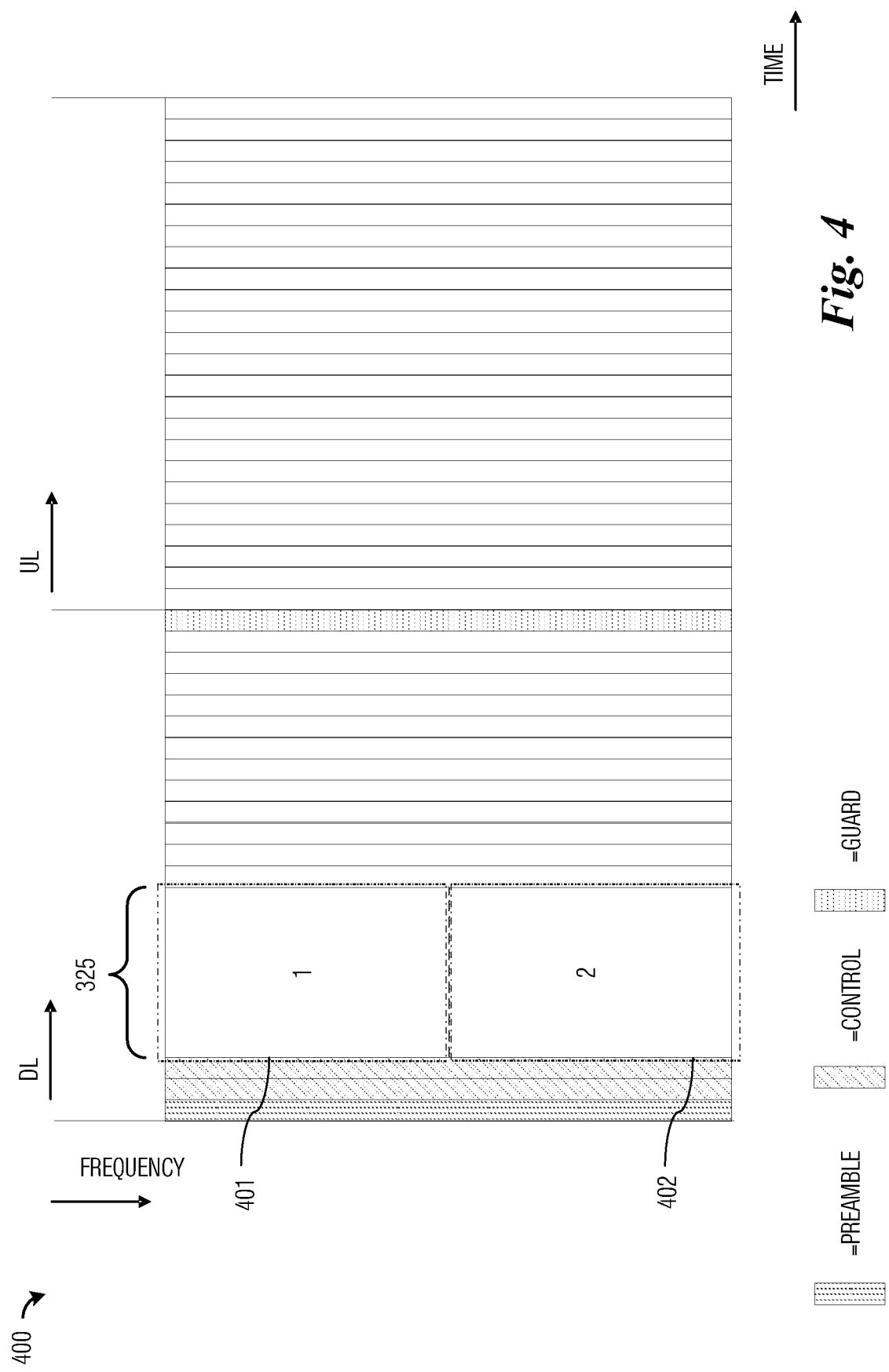
FIG. 4 is a diagram of a set of OFDMA time-frequency resources of an OFDMA frame, showing a second possible region configuration.
Figure 5:
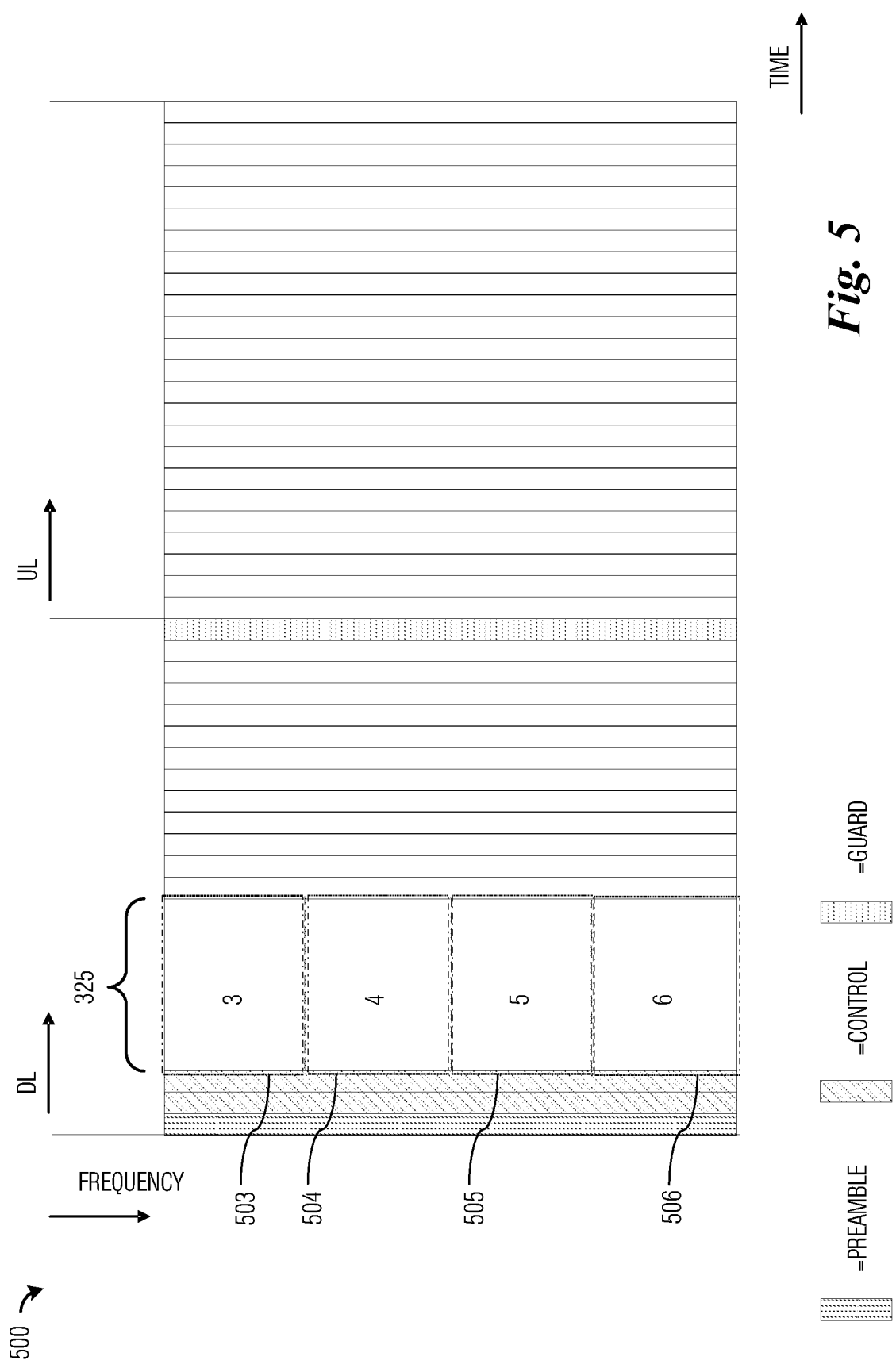
FIG. 5 is a diagram of a set of OFDMA time-frequency resources of an OFDMA frame, showing a third possible region configuration.
Figure 6:
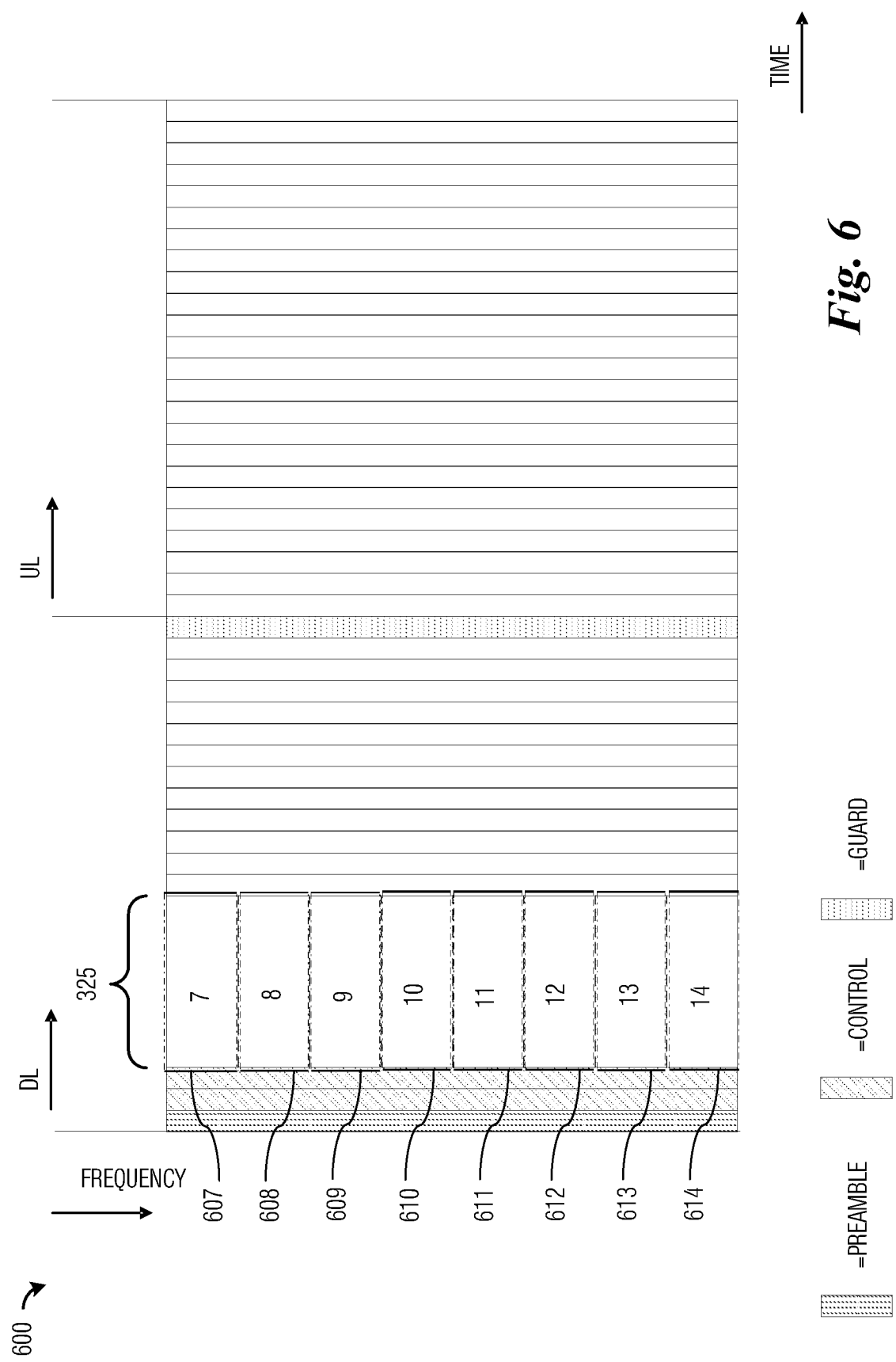
FIG. 6 is a diagram of a set of OFDMA time-frequency resources of an OFDMA frame, showing a fourth possible region configuration.

FIG. 4 illustrates a view of a set of OFDMA time-frequency resources 400 of an OFDMA frame with the zone 325 assigned as two second largest time-frequency resource assignments, shown as highlight 401 (labeled node 1) and highlight 402 (labeled node 2). Nodes 1 and 2 each consist of eight (8) OFDM symbols with 192 usable OFDM subcarriers. FIG. 5 illustrates a view of a set of OFDMA time-frequency resources 500 of an OFDMA frame with the zone 325 assigned as four third largest time-frequency resource assignments, shown as highlight 503 (labeled node 3), highlight 504 (labeled node 4), highlight 505 (labeled node 5), and highlight 506 (labeled node 6). Nodes 3, 4, 5, and 6 each consist of eight (8) OFDM symbols with 96 usable OFDM subcarriers. FIG. 6 illustrates a view of a set of OFDMA time-frequency resources 600 of an OFDMA frame with the zone 325 assigned as eight fourth largest time-frequency resource assignments, shown as highlight 607 (labeled node 7), highlight 608 (labeled node 8), highlight 609 (labeled node 9), highlight 610 (labeled node 10), highlight 611 (labeled node 11), highlight 612 (labeled node 12), highlight 613 (labeled node 13), and highlight 614 (labeled node 14). Nodes 7, 8, 9, 10, 11, 12, 13, and 14 each consist of eight (8) OFDM symbols with 48 usable OFDM subcarriers.

As shown in FIG. 3 through FIG. 6, the nodes may correspond to a logical representation of the time-frequency resources of the OFDMA communications system. Each logical time-frequency resource may map to a physical time-frequency resource, with the mapping of logical time-frequency resource to physical time-frequency resource being dependent on which subcarrier permutation being used, for example, the subcarrier permutations as defined by the IEEE 802.16 standard. The mapping of logical time-frequency resources to physical time-frequency resources may change with time and may depend on one or more parameters as defined by the OFDMA communications system. For example, in some OFDMA communications systems, there may be a default subcarrier permutation, which may be used by the BS and the MS until the BS sends a control channel message to change the subcarrier permutation. In general, any mapping of logical time-frequency resources to physical time-frequency resources may be used as long as it is known by both the BS and the MS. For example, the logical time-frequency resource node 7 (highlight 607) may map to physical OFDM symbols 4 through 11 and physical OFDM subcarriers 0 through 47 in a first subcarrier permutation and in a second subcarrier permutation, map to physical OFDM symbols 4 through 11 and physical OFDM subcarriers 0, 8, 16, 24, . . . , 376.

Figure 7:
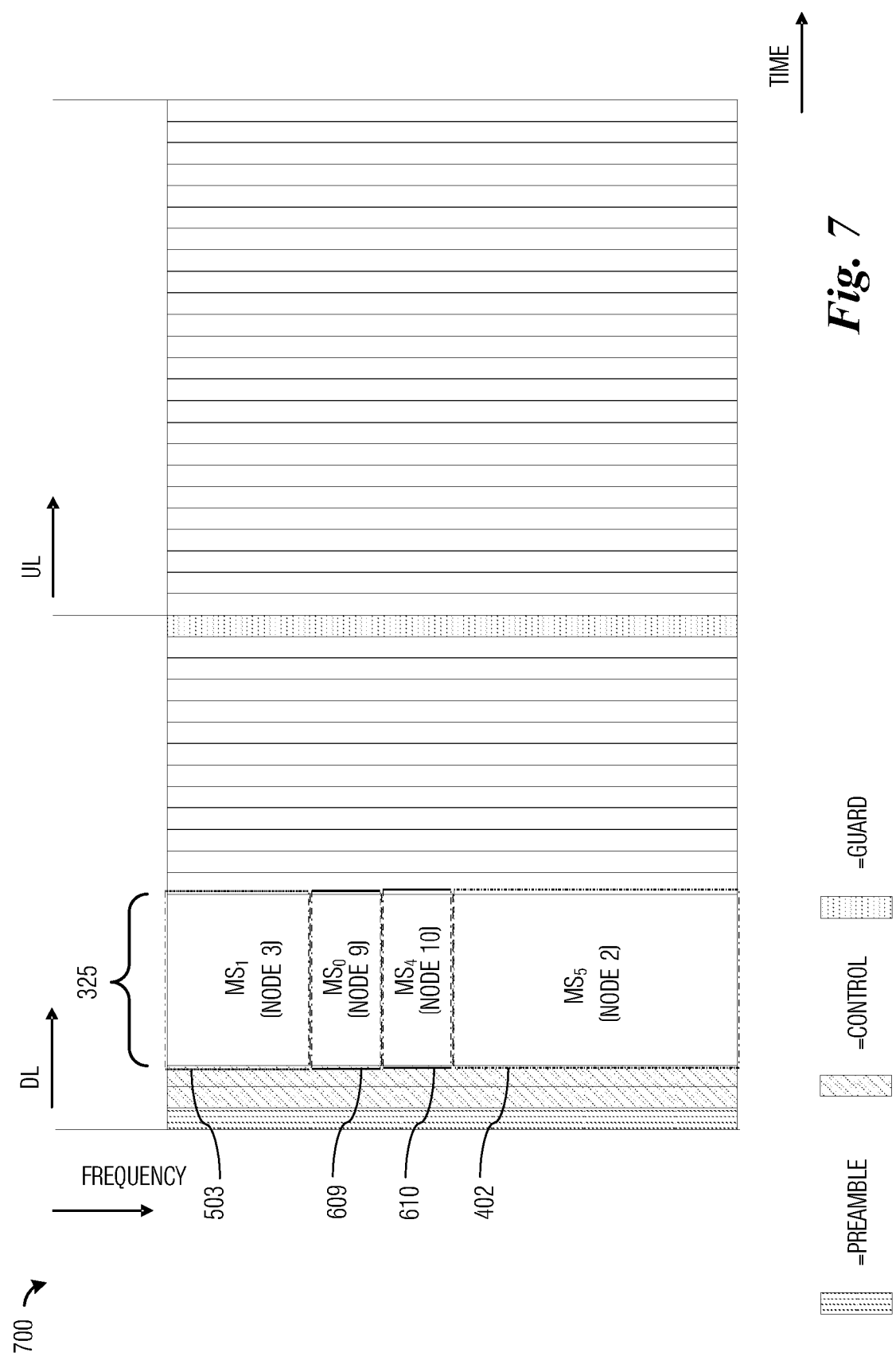
FIG. 7 is a diagram of a set of OFDMA time-frequency resources of an OFDMA frame, showing a fifth possible region configuration.

FIG. 7 illustrates a view of a set of OFDMA time-frequency resources 700 of an OFDMA frame, with assignments for four (4) MS ($MS_0$, $MS_1$, $MS_4$, and $MS_5$). For an OFDMA frame, a scheduler, such as the scheduler 140, may determine which MS will be assigned time-frequency resources as well as a size of the assignment. For example, the operation of the scheduler 140 may be based on factors such as channel quality indications of the MS, quality of service (QoS) requirements of the MS, information/data transfer requirements of the MS, and so forth. Additionally, the scheduler 140 may force an MS to wait for a time-frequency resource assignment. For example, if a channel quality indicator of an MS is low, then the MS may be forced to wait until its channel quality indicator improves prior to being assigned time-frequency resources.

After making an assignment, the scheduler 140 may transmit to the MS an indication (or indicator) of the assignment. As shown in FIG. 7, the scheduler 140 has assigned node 3 (highlight 503) to $MS_1$, node 9 (highlight 609) to $MS_0$, node 10 (highlight 610) to $MS_4$, and node 2 (highlight 402) to $MS_5$. The scheduler 140 may then transmit an indication of the assignment to the MS using an assignment message which may be transmitted on a control channel. The MS receiving the assignment message may then determine their respective assignments.

FIG. 8 illustrates a channel tree 800. As shown in FIG. 8, the nodes of the channel tree 800, referred to as a channel tree node, may correspond to time-frequency resource assignment labels (node numbers) used in FIG. 3 through FIG. 7. For example, channel tree node 810, labeled node 0, may correspond to node 0 (highlight 301 of FIG. 3). The channel tree node 810 may be referred to as being a parent node and may represent an entirety of logical time-frequency resources. Additionally, channel tree nodes at a bottom of the channel tree 800 may be referred to as channel tree base nodes, such as a channel tree base node 820, may correspond to a smallest time-frequency resource assignment that may be assigned by a BS.

Each channel tree node may be referred to by its channel tree index or more generally, channel identifier (channel ID). For example, channel tree node 810 may be referred to by its channel tree index of zero (0), while channel tree base node 820 may be referred to by its channel tree index of 14. In some OFDMA communications systems, the channel tree index may correspond to a spreading code, such as spreading codes used in a CDMA OFDMA communications system.

In general, each channel tree base node, such as channel tree base node 820, may correspond to a set of radio resources. A channel tree base node may map to time slots, frequencies, codes, and so forth. The use of a tree structure may help ensure that any assignment of time-frequency resources may be represented as a series of channel tree base nodes. For example, an assignment of channel tree node 3 840 may be equivalent to an assignment of channel tree base nodes 7 842 and 8 843.

FIG. 9 illustrates a channel tree 900 with 128 channel tree base nodes. A channel tree node 905 labeled node 0 represents an entirety of time-frequency resources. As shown in FIG. 9, the channel tree 900 is a binary tree, wherein each channel tree node may be sub-divided into two channel tree nodes in a next lower level of the channel tree 900. For example, the channel tree node 905 may be sub-divided into channel tree node 1 907 and channel tree node 2 908, with channel tree node 1 907 and channel tree node 2 908 each representing 50% of the entirety of time-frequency resources. Channel tree node 127 910 through channel tree node 254 912 may be referred to as channel tree base nodes and may represent the smallest assignable time-frequency resources. Highlight 920 encompasses a portion of the channel tree 900 beneath a channel tree node 15 922. FIG. 10 illustrates a detailed view of a portion of the channel tree 900 beneath the channel tree node 15 922.

Each channel tree node of a channel tree may correspond to a physical time-frequency resource(s). For example, in an OFDMA communications system with 384 useable subcarriers, indexed 0 to 383, with a first channel tree configuration, channel tree node 0 may correspond to subcarriers with indices 0 to 383, channel tree node 1 may correspond to subcarriers with indices 0 to 191 and channel tree node 2 may correspond to subcarriers with indices 192 to 383. While with a second channel tree configuration, channel node 0 may correspond to subcarriers with indices 0 to 383, channel tree node 1 may correspond to subcarriers with indices 0, 2, 4, . . . , 382 and channel tree node 2 may correspond to subcarriers with indices 1, 3, 4, . . . , 383. The mapping of tree channel nodes (logical time-frequency resources) to physical time-frequency resources may change with time and may be different in different zones (sectors). As long as both the BS and the MS is aware of the mapping, any mapping may be possible. The mapping may be stored at the BS and the MS, transmitted to the MS by the BS, determined at the MS based on parameters received from the BS, and so forth. In the IEEE 802.16 standard, the mappings may be referred to as subcarrier permutations.

Figure 11:
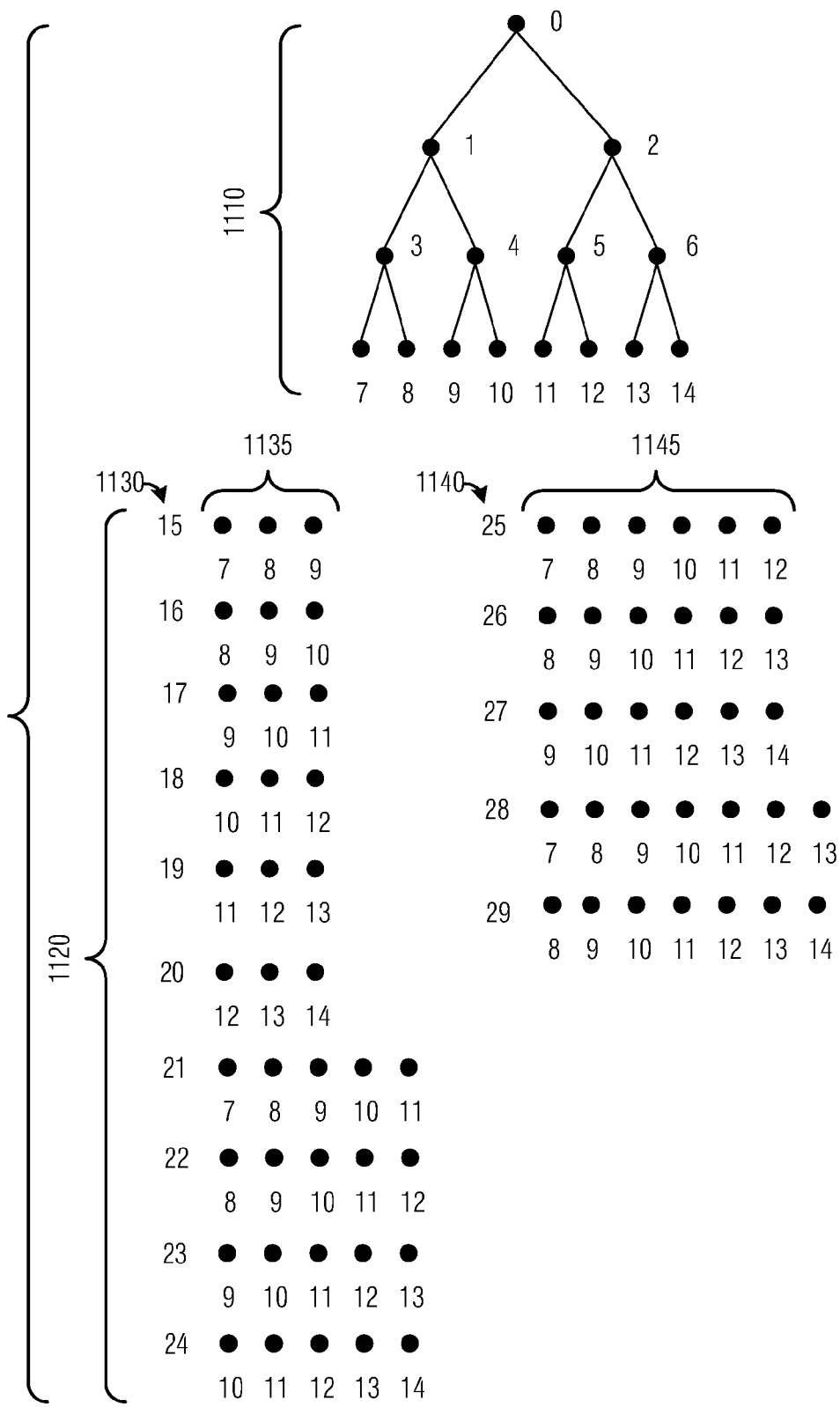
FIG. 11 is a diagram of a channel tree having two non-orthogonal sets of mappings.

FIG. 11 illustrates a pair of mappings, including a channel tree 1110. The channel tree 1110 may be similar to the channel tree 800 in that it is arranged as a binary tree. The channel tree 1110 may be used to represent a first mapping of channel tree base nodes to channel tree nodes. Although the channel tree 1110 is shown to be a binary tree, the channel tree 1110 may have other configurations, including tertiary, quadiary, quintiary, and so on, as well as irregular trees. In addition to the first mapping of channel tree base nodes to channel tree nodes as provided by the channel tree 1110, FIG. 11 illustrates a list 1120 providing a second mapping of channel tree base nodes to channel tree nodes. A mapping in the second mapping may be represented by a channel tree node number, such as channel tree node 15 1130 and channel tree node 25 1140, and a group of two or more channel tree base nodes, such as group 1135 that includes channel tree base nodes 7, 8, and 9 and group 1145 that includes channel tree base nodes 7, 8, 9, 10, 11, and 12. The mappings shown in the list 1120 may be exemplary mappings, and other mappings may be possible. Therefore, the mappings shown in the list 1120 should not be construed as being limiting to either the scope or the spirit of the embodiments.

The second mapping of channel tree base nodes to channel tree nodes (as shown in the list 1120) may be non-orthogonal to the first mapping (as shown in the channel tree 1110). In general, the second mapping may be non-orthogonal to the first mapping if none of the mappings in the second mapping may be represented by a single mapping in the first mapping. The second mapping of channel tree base nodes to channel tree nodes in the second mapping in the list 1120 may have the same number of channel tree nodes as in the first mapping of channel tree base nodes to channel tree nodes. In general, a number of bits used to represent the second mapping of channel tree base nodes to channel tree nodes may be equal to a number of bits used to represent the first mapping of channel tree base nodes to channel tree nodes. Therefore, a number of bits used to represent a combination of the first mapping and the second mapping may only be one more than the number of bits used to represent either the first mapping or the second mapping. For example, as shown in FIG. 11, four (4) bits may be used to represent either the first mapping or the second mapping and five (5) bits may be used to represent the combination of the first mapping and the second mapping. Since the mappings of the channel tree base nodes to the channel tree nodes in the second mapping differs from the mappings of the channel tree base nodes to the channel tree nodes in the first mapping, considerable additional flexibility in the assignment of time-frequency resources may be gained with the additional use of a single bit per assignment.

Figure 11A:
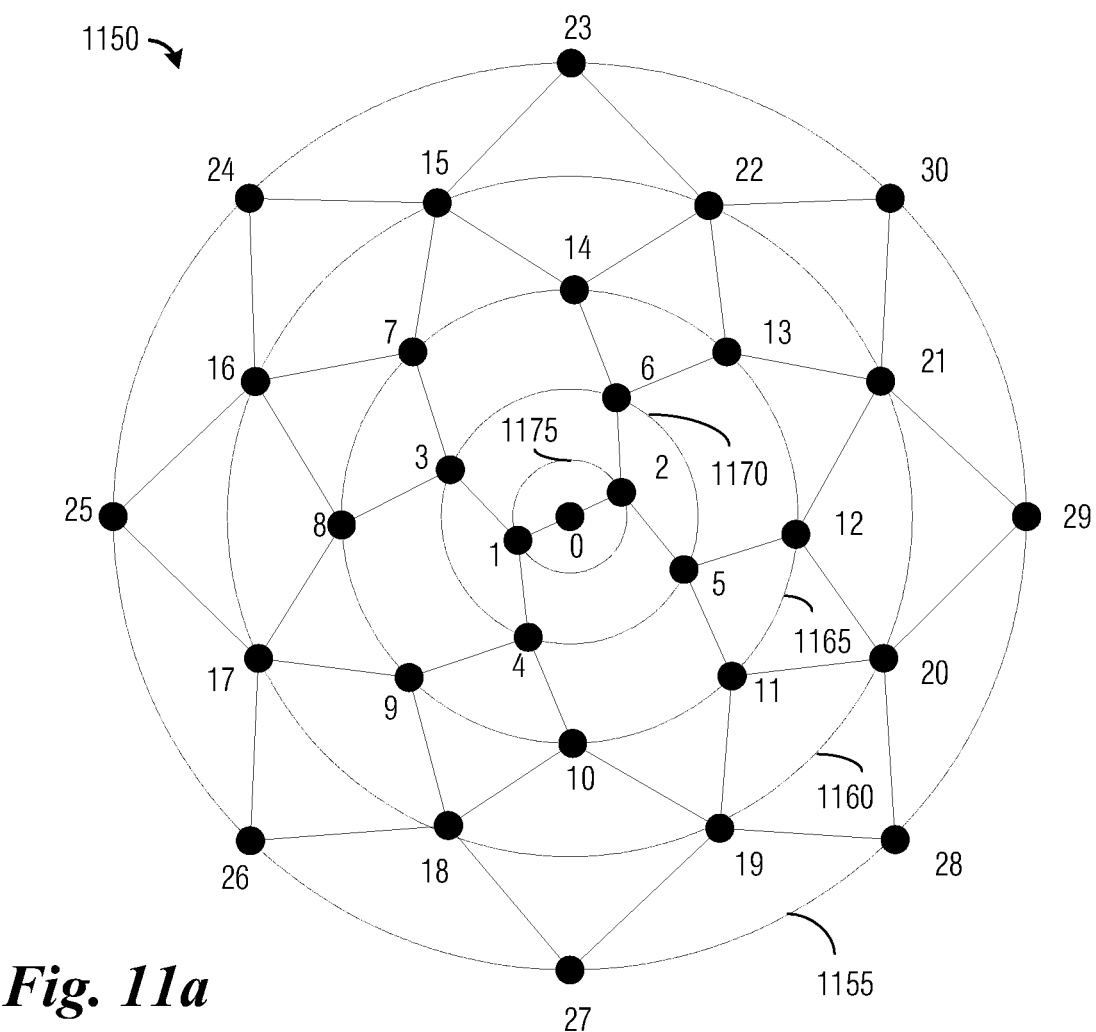
FIG. 11a is a diagram of an annular channel tree.

FIG. 11a illustrates a channel tree 1150. The channel tree 1150 may be arranged as an annular tree, with channel tree base nodes 23 through 30 located on an outermost ring 1155 of the channel tree 1150 and parent nodes located on inner rings (rings 1160 through 1175) of the channel tree 1150. The channel tree 1150 also includes a parent node (node 0) at a center of ring 1175. Channel tree nodes on ring 1160 (nodes 15 through 22) may each represent two channel tree base nodes (for instance, node 15 may represent channel tree base nodes 23 and 24). Channel tree nodes on ring 1165 (nodes 7 through 14) may each represent three channel tree base nodes (for example, node 14 may represent channel tree base nodes 23, 24, and 30). Channel tree nodes on ring 1170 (nodes 3 through 6) may represent four channel tree base nodes (for example, node 4 may represent channel tree base nodes 25, 26, 27, and 28), channel tree nodes on ring 1175 (nodes 1 and 2) may represent six channel tree base nodes (for example, node 1 may represent channel tree base nodes 23, 24, 25, 26, 27, and 28), and the parent node may represent all eight channel tree base nodes.

The structure of the channel tree 1150 may be circular in nature for the rings 1160 and 1165. As illustration, channel tree node 22 of the ring 1160 may correspond to channel tree base node 23 (a lowest numbered channel tree base node) and channel tree base node 30 (a highest numbered channel tree base node). Similarly, channel tree node 14 of the ring 1165 may correspond to channel tree nodes 15 and 22. In general, in a channel tree having an annular tree structure, at least one ring of the channel tree may have a channel tree node that corresponds to channel tree nodes from a next larger ring that are adjacent in a circular manner. For example, channel tree nodes 23 and 30 are not linearly adjacent but are circularly adjacent.

As shown in FIG. 11a, there may be eight (8) channel tree nodes in each of the three outer most rings (rings 1155, 1160, and 1165) of the channel tree 1150. Then, ring 1170 may have 8/2=4 channel tree nodes, while ring 1175 may have 8/4=2 channel tree nodes. Finally, an innermost ring has a single node, the parent node. In general, in a channel tree having an annular tree structure, there may be N rings containing an equal number of channel tree nodes (with the number also being equal to a number of channel tree base nodes K), followed by M rings which may combine multiple nodes from an outer ring that is immediately adjacent. As shown in FIG. 11a, N=3, K=8, and M=3.

In general, a binary annular channel tree, such as the channel tree 1150, may be described using mathematical expressions below:

A number of annular tree base nodes=X,
A number of radix two channel tree nodes=Y.

$$Y=2^{ceil(log2(X))},$$

A total number of nodes=Z.

$$Z=4Y-1.$$

Mappings of channel tree nodes in a binary annular channel tree may be expressed mathematically as:

Assigned channel tree node identifier=w,

If $2Y \leq w \leq 3Y-1$ and $y=w-2Y$, then w maps to three (3) channel tree base nodes:

{first base node y, second base node (y+1)mod Y, third base node (y+2)mod Y}.    (1)

If $Y \leq w \leq 2Y-1$ and $y=w-Y$, then w maps to two (2) channel tree base nodes:

{first base node y, second base node (y+1)mod Y}    (2)

If $3Y \leq w$, then

Step one: node w maps to nodes {Z1,Z2, . . . , Zn} according to binary tree rules, $2Y \leq$ each entry Zi<3Y, i=1 . . . n, Step two: nodes {Z1,Z2, . . . , Zn} map to channel tree base nodes according to rule (1) above excluding repeated base nodes.    (3)

If w<Y, node w maps back to base node w.    (4)

As shown in FIG. 11a, the M rings may be the M inner rings of the channel tree 1150 and may be representative of a first mapping of channel tree nodes to channel tree base nodes. The N rings may be the N outer rings of the channel tree 1150 and may be representative of a second mapping of channel tree to channel tree base nodes.

In order to represent all of the channel tree nodes of the channel tree 1150, five bits may be needed. This may be one bit more than the four bits needed to represent a channel tree, such as the channel tree 800, having the same number of channel tree base nodes. The addition of an additional bit may slightly increase control channel overhead but yield a considerable increase in the flexibility of the assignment of time-frequency resources.

Figure 12:
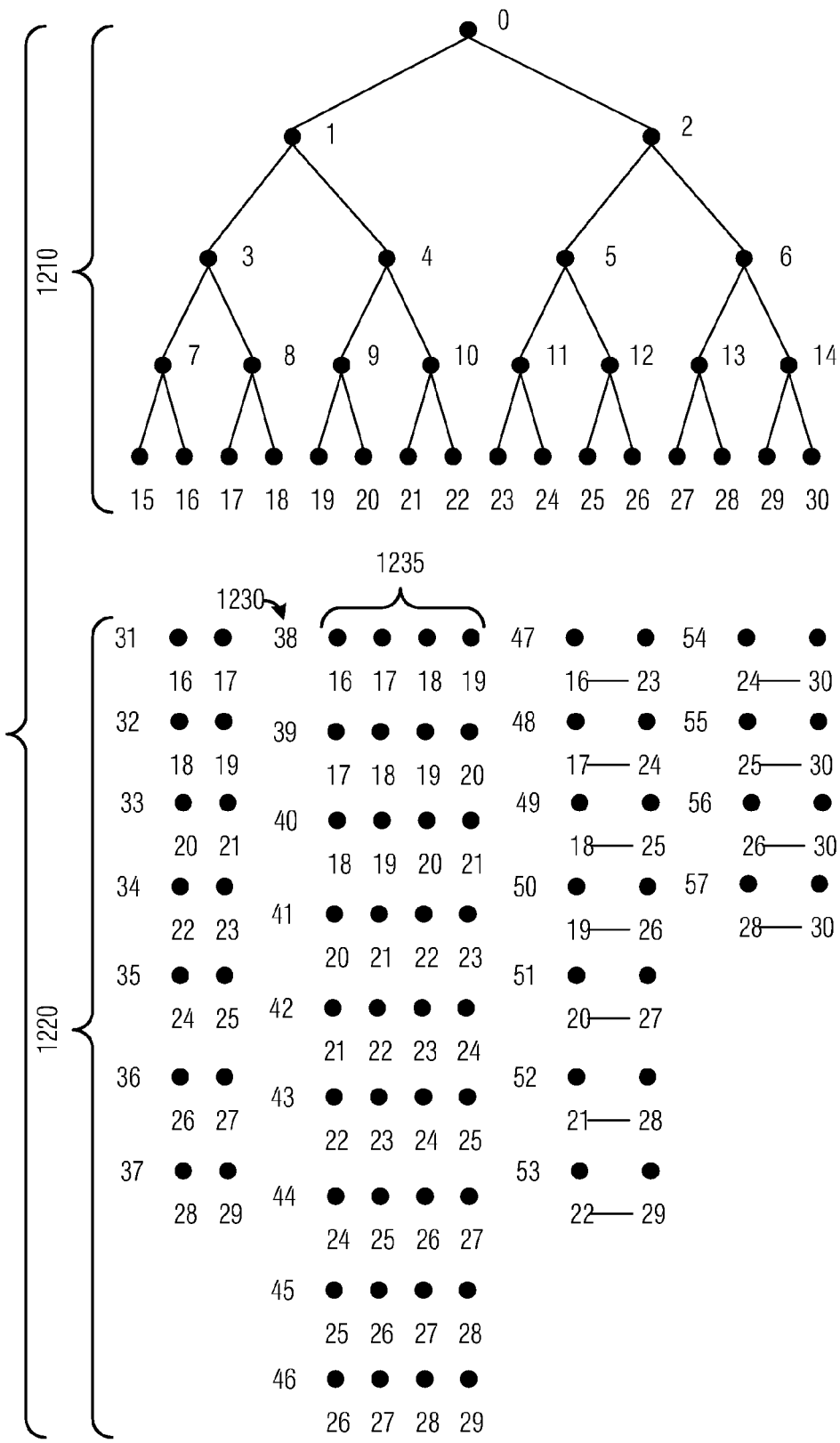
FIG. 12 is a diagram of a channel tree having two non-orthogonal sets of mappings.

FIG. 12 illustrates a pair of mappings, including a channel tree 1210. The channel tree 1210 may be similar to the channel tree 800 in that it is arranged as a binary tree. The channel tree 1210 may be used to represent a first mapping of channel tree base nodes to channel tree nodes. In addition to the first mapping of channel tree base nodes to channel tree nodes as provided by the channel tree 1210, FIG. 12 illustrates a list 1220 providing a second mapping of channel tree base nodes to channel tree nodes. A mapping in the second mapping may be represented by a channel tree node number, such as channel tree node 38 1230, and a group of two or more channel tree base nodes, such as group 1235 that includes channel tree base nodes 16, 17, 18, and 19. The mappings shown in the list 1220 may be exemplary mappings, and other mappings may be possible. Therefore, the mappings shown in the list 1220 should not be construed as being limiting to either the scope or the spirit of the embodiments.

The second mapping of channel tree base nodes to channel tree nodes (as shown in the list 1220) may be non-orthogonal to the first mapping (as shown in the channel tree 1210). The list 1220 includes channel tree nodes 31 through 37 with each channel tree node corresponding to two channel tree base nodes, channel tree nodes 38 through 46 with each channel tree node corresponding to four channel tree base nodes, channel tree nodes 47 through 53 with each channel tree node corresponding to eight channel tree base nodes. The list 1220 also includes channel tree node 54, 55, 56, and 57, which correspond to 7, 6, 5, and 3 channel tree base nodes, respectively. As shown in FIG. 12, the list 1220 may have fewer channel tree nodes than the channel tree 1210.

Figure 13:
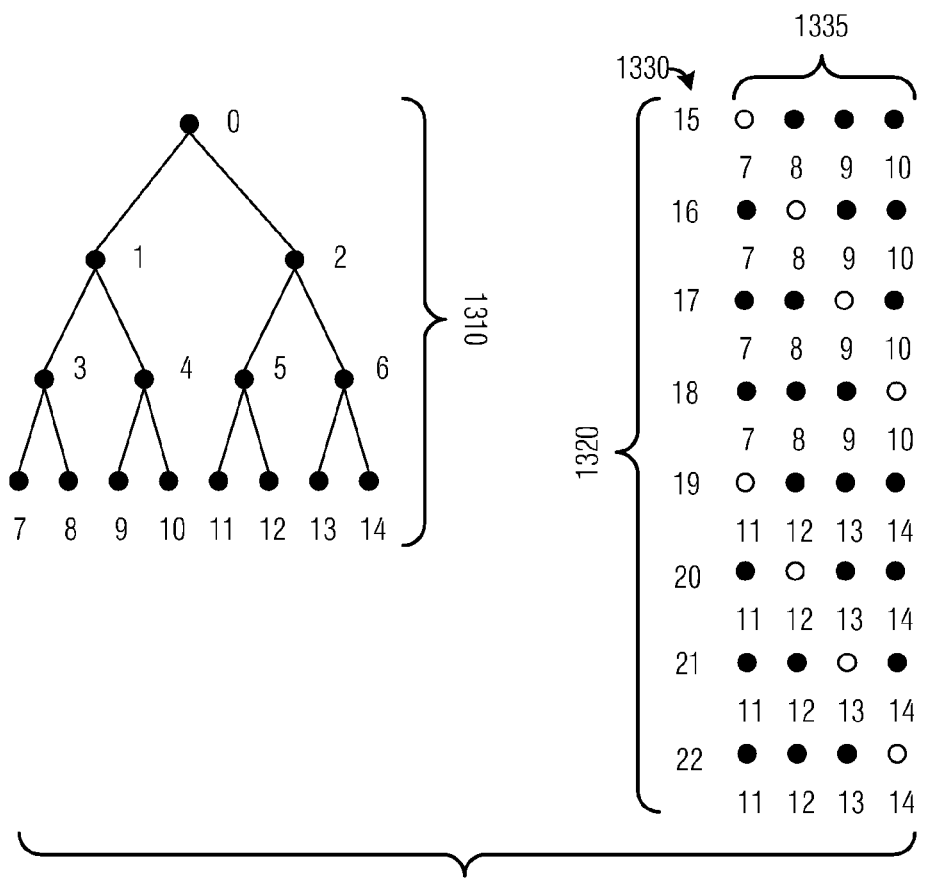
FIG. 13 is a diagram of a channel tree having two non-orthogonal sets of mappings.

FIG. 13 illustrates a pair of mappings, including a channel tree 1310. The channel tree 1310 may be similar to the channel tree 800 in that it is arranged as a binary tree. The channel tree 1310 may be used to represent a first mapping of channel tree base nodes to channel tree nodes. In addition to the first mapping of channel tree base nodes to channel tree nodes as provided by the channel tree 1310, FIG. 13 illustrates a list 1320 providing a second mapping of channel tree base nodes to channel tree nodes. A mapping in the second mapping may be represented by a channel tree node number, such as channel tree node 15 1330, and a group of two or more channel tree base nodes, such as group 1335 that includes channel tree base nodes 7, 8, 9, and 10. However, the channel tree base node 7 may be represented by an unfilled circle, indicating that the channel tree base node 7 remains unassigned. Such a structure may allow the BS to assign discontinuous time-frequency resources. The mappings shown in the list 1320 may be exemplary mappings, and other mappings may be possible. Therefore, the mappings shown in the list 1320 should not be construed as being limiting to either the scope or the spirit of the embodiments. The second mapping of channel tree base nodes to channel tree nodes (as shown in the list 1320) may be non-orthogonal to the first mapping (as shown in the channel tree 1310). As shown in FIG. 13, the list 1320 may have fewer channel tree nodes than the channel tree 1310.

Figure 14:
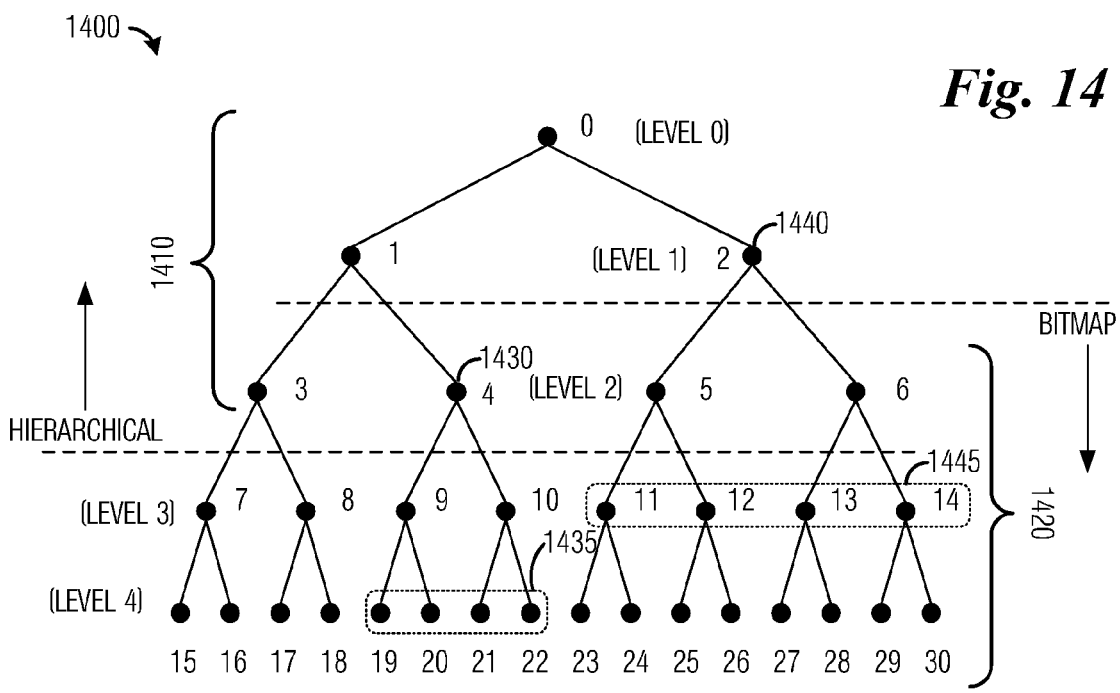
FIG. 14 is a diagram of a channel tree having two portions with mappings represented by an index and a bitmap, respectively.

FIG. 14 illustrates a channel tree 1400. The channel tree 1400 may be divided into two portions, an upper portion 1410 and a lower portion 1420. It may be possible for the upper portion 1410 and the lower portion 1420 to overlap, as shown in FIG. 14. An assignment of a time-frequency resource made using the channel tree 1400 may involve two parts. A first part may be a channel tree index that specifies a channel tree node in the upper portion 1410. As shown in FIG. 14, the channel index may be a three-bit value used to specify a channel tree node between a channel tree node 0 through a channel tree node 6.

A second part may be a bitmap that may be used to address channel tree nodes a specified number of levels beneath the channel tree node specified in the first part, shown in FIG. 14 as the lower portion 1420. If the bitmap is two bits long, then the bitmap may be used to specify channel tree nodes on a level immediately below the channel tree node specified in the first part, while if the bitmap is four bits long, then the bitmap may be used to specify channel tree nodes on two levels below the channel tree node specified in the first part, and so on.

For example, if the first part of an assignment is three bits long and the second part of the assignment is four bits long, then if the first part of an assignment specifies channel tree node 4 1430, then the second part of the assignment may specify an assignment for channel tree nodes in grouping 1435. Similarly, if the first part of an assignment specifies channel tree node 2 1440, then the second part of the assignment may specify an assignment for channel tree nodes in grouping 1445. In general, if the channel tree is of degree K, then with a bitmap of length J, the bitmap (the second part) may be used to specify assignments for nodes $\log_K J$ levels below the channel tree node specified in the first part.

Depending on the length (number of bits) of the bitmap, the lower portion 1420 may encompass different portions of the channel tree 1400. In general, the lower portion 1420 may encompass levels of a channel tree $\log_2 J$ levels below a highest level of the channel tree, where J is the number of bits in the bitmap. Typically, the lower portion 1420 may begin $\log_2 J$ levels below the parent node of the channel tree. For example, if the bitmap is four bits long, then the lower portion 1420 may encompass portions of the channel tree two levels below the highest level of the channel tree and below. As shown in FIG. 14, the highest level of the channel tree 1400 is the parent node (node 0), then the lower portion 1420 includes the nodes of the channel tree 1400 at level two (2) and lower (given that the parent node is at level zero (0)).

After making the assignments of the first part and the second part, a BS may transmit the first part and the second part to a MS. At the MS, the MS may use the first part and the second part to decode its time-frequency resource assignment.

It may be possible to change the length of the first part and/or the second part over time to allow a BS to trade-off resource assignment granularity for control channel overhead. For example, if the BS determines that control channel overhead has increased above a threshold, then the BS may elect to shorten the length of the bitmap (the second part) to reduce control channel overhead. The reverse may also be true, wherein the BS may elect to obtain additional control over the granularity of the time-frequency resource assignments by lengthening the length of the bitmap. Lengthening or shortening the length of the second part may have an impact on the length of the first part. It may be possible to increase the length of the second part to a point wherein the bitmap is as long as the number of channel tree base nodes. Alternatively, it may be possible to eliminate the bitmap entirely by shortening it to a length zero (0) sequence.

Figure 14A:
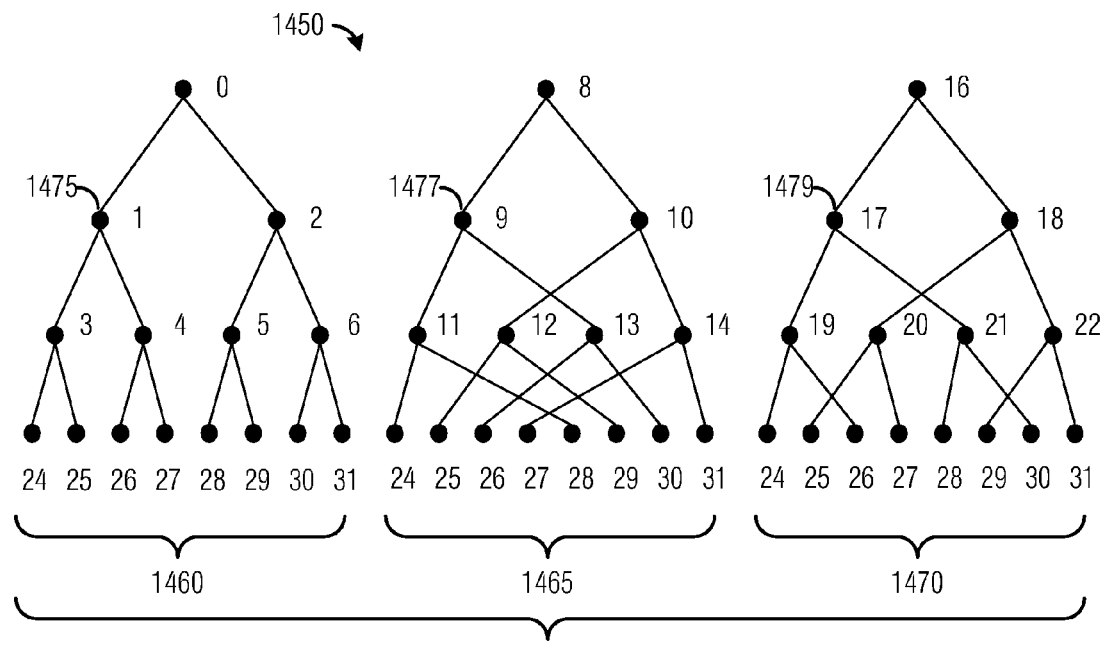
FIG. 14a is a diagram of three channel trees having different configurations.

FIG. 14a illustrates a channel tree 1450. The channel tree 1450 includes a set of channel tree base nodes (nodes 24 through 31) and three sets of assignments, with each set of assignment shown as an individual subchannel tree (subchannel trees 1460 through 1470). The subchannel trees may share the set of channel tree base nodes, but may have different channel tree nodes and associated mappings. For example, channel tree node 1 1475 of subchannel tree 1460 may correspond to an assignment of channel tree base nodes 24 through 27, while channel tree node 9 1477 of subchannel tree 1465 may correspond to an assignment of channel tree base nodes 24, 26, 28, and 30, and channel tree node 17 1479 of subchannel tree 1470 may correspond to an assignment of channel tree base nodes 24, 26, 28, and 30. Since the subchannel trees 1460 through 1470 include the set of channel tree base nodes, the subchannel trees may be indexed using one additional bit than what is necessary to index any one of the subchannel trees. The use of the subchannel trees may allow additional time-frequency resource assignment flexibility with a small increase in control channel overhead.

Figure 15:
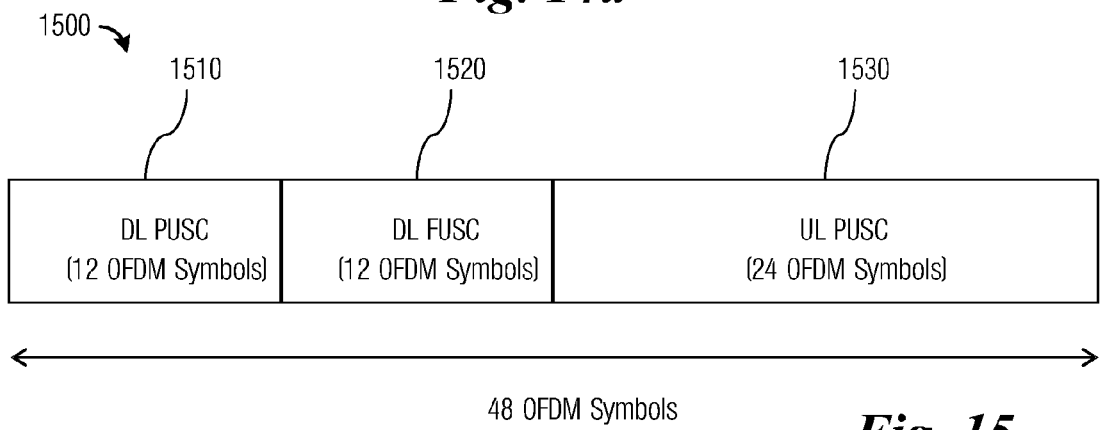
FIG. 15 is a diagram of an OFDMA frame.

FIG. 15 illustrates a view of an OFDMA frame 1500. The OFDMA frame 1500 may be divided into multiple regions, a first region (or zone) 1510 may be a downlink partial usage of subcarriers (DL PUSC), a second region (or zone) 1520 may be a DL full usage of subcarriers (DL FUSC), and a third region (or zone) 1530 may be an uplink PUSC (UL PUSC). The DL PUSC 1510, the DL FUSC 1520, and the UL PUSC 1530 may be exemplary subcarrier permutations as defined in the IEEE 802.16 standard. Other permutations may also be defined in the standard. Although the regions are shown with specific subcarrier permutations, each region may make use of any subcarrier permutation permitted by the standard. For DL PUSC, in a 5 MHz bandwidth, there may be 360 data subcarriers divided into 15 subchannels, wherein each subchannel has 24 subcarriers. For DL FUSC, in a 5 MHz bandwidth, there may be 384 data subcarriers divided into 8 subchannels, wherein each subchannel has 48 subcarriers. For UL PUSC, in a 5 MHz bandwidth, there may be 408 subcarriers (data plus pilot) divided into 17 subchannels, wherein each subchannel has 24 subcarriers (16 data plus 8 pilot).

As shown in FIG. 15, there may be two regions defined for the DL, namely a DL PUSC in the first region 1510 and a DL FUSC in the second region 1520, wherein each region may have 12 OFDM symbols. For the UP, one region may be defined. The UL includes the third region 1530 defined as UL PUSC, which may have 24 OFDM symbols. The BS may transmit an indication of region boundaries to the MS on a control channel. For example, the BS may transmit a region definition message on the control channel, wherein the region definition message may contain an indicator of subcarrier permutation DL FUSC and OFDM symbol number 12 to the MS. A default subcarrier permutation may also be used. For example, a default subcarrier permutation, such as DL PUSC, may be assumed until a region definition message (or some other message) is received and overrides the DL PUSC. Furthermore, the BS may transmit region definition messages containing an indication of UL PUSC and OFDM symbol number 24 to the MS.

In another embodiment, different channel tree structures may be used to support different types of service, even within a single region. For example, file transfer protocol (FTP) traffic may use a channel tree structure similar to FIG. 11, while voice over Internet protocol (VoIP) traffic may use a channel tree structure similar to FIG. 12. The association of a particular channel tree structure with a particular service type may be transmitted from the BS to the MS using a control channel or it may be stored in the BS and the MS. In general, any mapping of channel tree structure to service type may be used as long as it is known at both the BS and the MS. The service type may be associated with a connection identifier (CID) of the MS. For example, the MS may have a first CID for FTP traffic, a second CID for VoIP traffic, and so on. The MS may then determine the channel tree structure to use based on the CID, which may be provided on an assignment message, for example.

Figure 16:
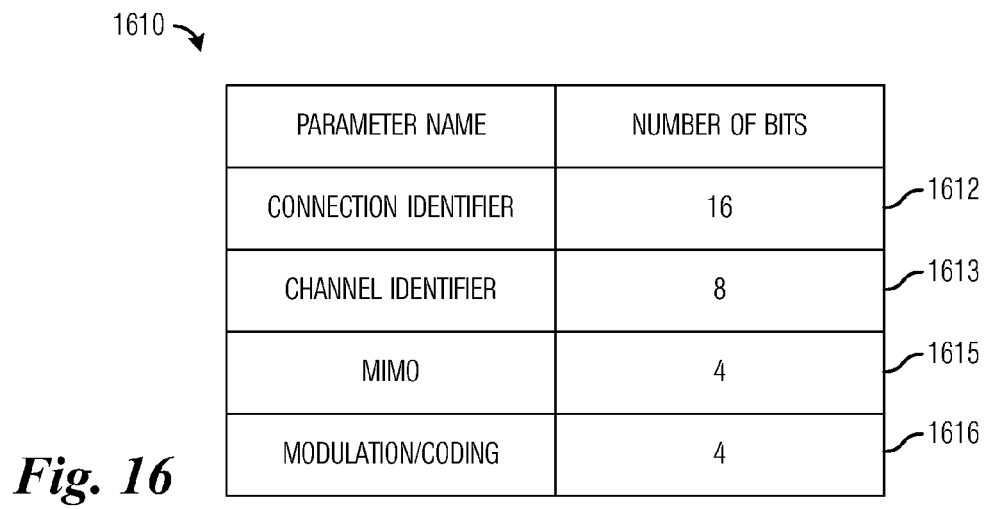
FIG. 16 is a diagram of an assignment message.

FIG. 16 illustrates an assignment message 1610. The assignment message 1610 may contain a 16-bit field indicating a CID 1612 of the MS. The CID may correspond to one or more MS. In some embodiments, the CID may not be actually included in the assignment message 1610, but may be used to scramble the assignment message 1610 instead. This may allow only the MS intended to receive the assignment message 1610 the ability to decode the assignment message 1610.

The assignment message 1610 may also contain an 8-bit channel identifier field 1613, where the channel identifier (also referred to as a channel tree index) may correspond to one of the nodes from a channel tree. The assignment message 1610 may further include a multiple input multiple output (MIMO) field 1615. The MIMO field 1615 may be used to indicate a type of MIMO used by the BS. Additionally, the MIMO field 615 may indicate precoding scheme, antenna configuration, and so forth. Furthermore, the assignment message 1610 may include a four-bit field indicating a modulation and coding field 1616. The modulating and coding field 1616 may provide information regarding the modulating and coding used by the BS. Techniques other than the assignment message 1610 may be used to transmit some or all of the information to the MS. Depending on an embodiment, not all of the discussed parameters may be used, and some parameters may omitted based on values of other parameters.

Figure 16A:
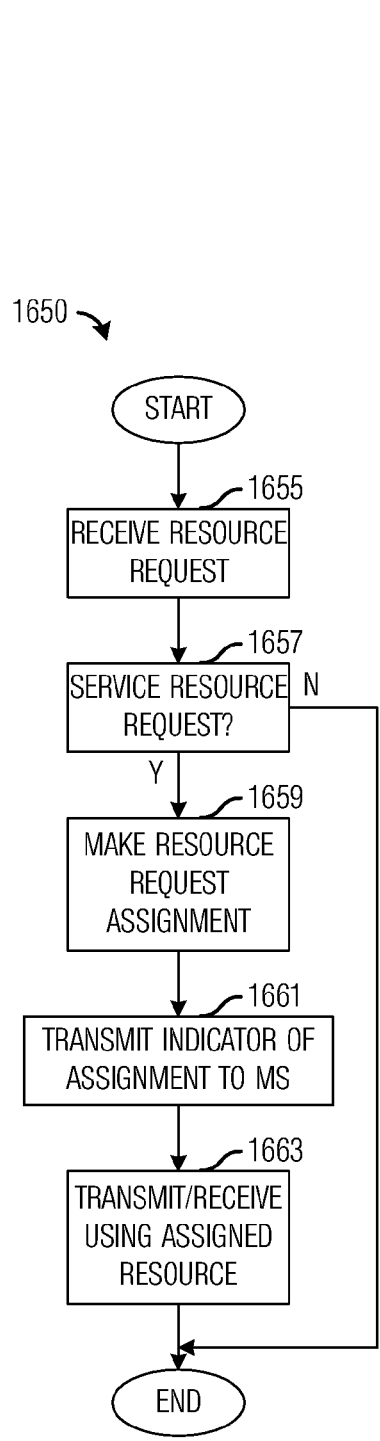
FIG. 16a is a diagram of a sequence of events in operating a base station.

FIG. 16a illustrates a sequence of events 1650 for BS operation. The sequence of events 1650 may be descriptive of events occurring in a BS as the BS receives a request for time-frequency resources. The sequence of events 1650 may occur when the BS receives a request for time-frequency resources directly from a MS, retrieves a stored (queued) time-frequency resource request, responds to a scheduled request for time-frequency resources, receives data to deliver to the MS, and so on.

The sequence of events 1650 may begin when the BS receives a time-frequency resource request (block 1655). As discussed above, the time-frequency resource request may have been received directly from a MS, retrieval of a stored time-frequency resource request, a response to a scheduled request for time-frequency resources, receives data to deliver to the MS, and so forth. The BS may determine if it will service the time-frequency resource request (block 1657). The BS may determine if it will service the time-frequency resource request based on factors including time-frequency resources available for allocation, amount of time-frequency resources requested, MS priority, service type priority, MS communications link quality, and so on. If the BS determines that it will not service the time-frequency resource request, then the sequence of events 1650 may terminate and the BS may return to normal operations.

If the BS determines that it will service the time-frequency resource request, then the BS may make the time-frequency resource assignment (block 1659). The BS may make the time-frequency resource assignment using a scheduler, such as the scheduler 140 (FIG. 1), and a channel tree. The channel tree may include one or more sets of mappings of logical time-frequency resources to physical time-frequency resources. If the channel tree includes multiple sets of mappings, then the sets of mappings may be non-orthogonal to each other. The time-frequency resource assignment may then correspond to a channel tree node, which may be a representation of time-frequency resources assigned in the resource assignment. The channel tree node may be represented as an index (a channel tree index) to enable compact and efficient conveyance of the resource assignment.

An indicator of the time-frequency resource assignment (for example, the channel tree index representing the time-frequency resource assignment) may then be transmitted to the MS over a control channel (block 1661). A copy of the channel tree may be stored at the MS or the MS may otherwise have access to the channel tree, so the indicator may be sufficient to convey the time-frequency resource assignment. After transmitting the indicator, the BS may transmit to the MS or the BS may receive from the MS using the assigned time-frequency resources (block 1663). The sequence of events 1650 may then terminate and the BS may return to normal operations.

Figure 16B:
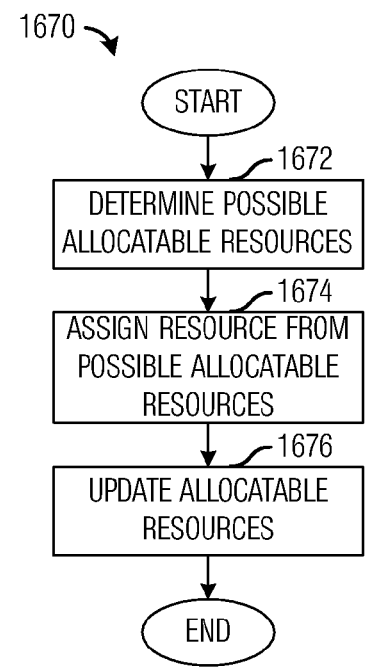
FIG. 16b is a diagram of a sequence of events in assigning radio resources.

FIG. 16b illustrates a sequence of events 1670 for making a resource request assignment. The sequence of events 1670 may be an implementation of the making a resource request assignment (block 1659) of FIG. 16a. The making a resource request assignment may begin with a determining of a set of possible allocatable resources based on the resource request (block 1672). The determining of the set of possible allocatable resources may be a set of time-frequency resources sufficient to satisfy the resource request. For example, the set of possible allocatable resources may include time-frequency resource mappings that provide time-frequency resource equal to or greater than the resource request.

After determining the set of possible allocatable resources, a member of the set may then be selected and assigned to the resource request (block 1674). The selected member may be a mapping that provides a sufficient amount of time-frequency resources to satisfy the resource request, a mapping that provides a smallest amount of time-frequency resources to satisfy the resource request, a first mapping of the set, and so forth. With the member selected and assigned, an update of allocatable resources may be performed (block 1676). For example, the update of allocatable resources may include marking the time-frequency resources associated with the member as having been assigned and may no longer be available for subsequent assignments (until the assignment completes). With the update complete, the making a resource request assignment may terminate.

Figure 16C:
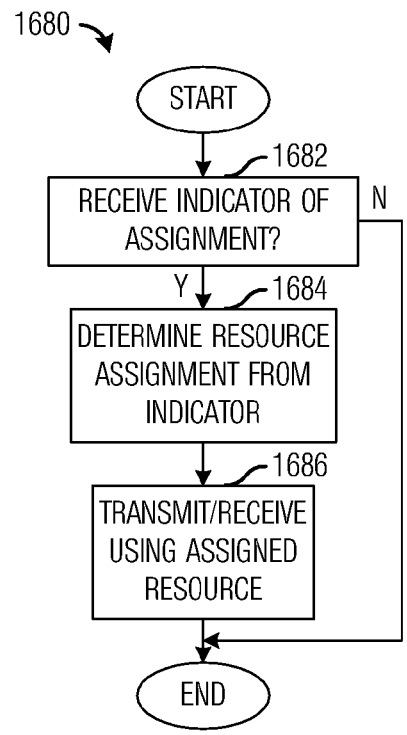
FIG. 16c is a diagram of a sequence of events in operating a mobile station.

FIG. 16c illustrates a sequence of events 1680 for MS operation. The sequence of events 1680 may be descriptive of events occurring in a MS as the MS receives an assignment of time-frequency resources from a BS. The sequence of events 1680 may begin with the MS receiving a control channel transmission from the BS, the control channel transmission may contain an indication of a time-frequency resource assignment, for example, a channel tree index (block 1682). The MS may then determine an actual time-frequency resource assignment from the indication of the time-frequency resource assignment (block 1684). For example, the channel tree index may be used to access a copy of a channel tree used by the BS in its assignment of the time-frequency resources. The MS may then determine the assigned time-frequency resources that the BS has assigned to it and the MS may then transmit to the BS or the MS may receive from the BS information transmitted over the assigned time-frequency resources (block 1686). The sequence of events 1680 may then terminate.

Figure 17:
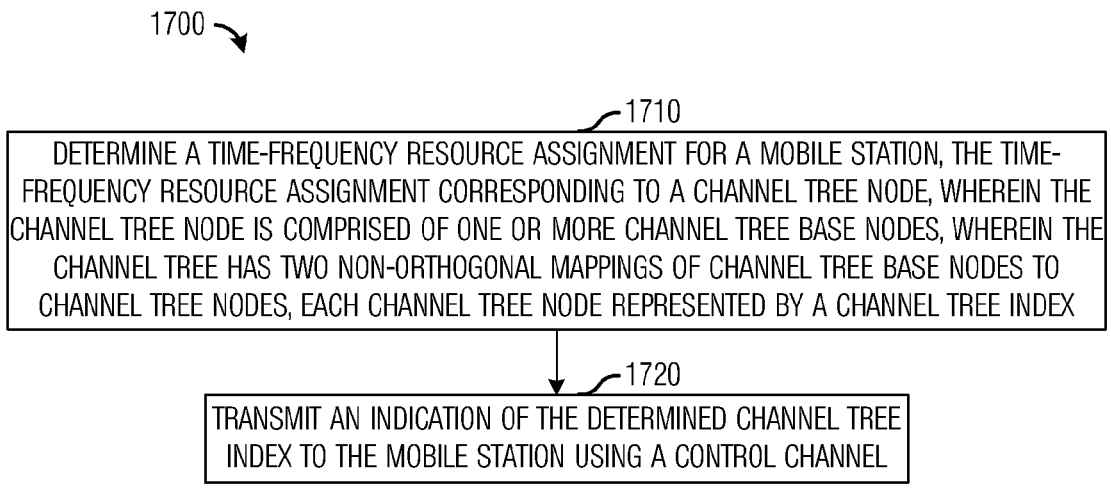
FIG. 17 is a diagram of a sequence of events in operating a base station.

FIG. 17 illustrates a sequence of events 1700 for BS operation. The sequence of events 1700 may be descriptive of events occurring in a BS as the BS determines an assignment of time-frequency resources for a MS and may be an implementation of block 1659 (FIG. 16a), wherein the BS makes an assignment of time-frequency resources to the MS. The sequence of events 1700 may occur when the BS makes an assignment of time-frequency resources to a MS in response to a received request, a queued request, a scheduled request, received traffic, and so forth. The sequence of events 1700 may begin with the BS determining a time-frequency resource assignment for a MS (block 1710). The time-frequency resource assignment may correspond to a selection of a channel tree node, where the channel tree node is comprised of one or more channel tree base nodes. The channel tree itself may include two non-orthogonal mappings of channel tree base nodes to channel tree nodes, each channel tree node having a channel tree index.

The determining of the time-frequency resource assignment for the MS may be based on factors including: MS priority, service type, service priority, bandwidth request amount, available time-frequency resources, communications link quality, amount of bandwidth already assigned to MS, amount of additional bandwidth to be assigned to MS, MS wait time, and so forth. The above listed factors, as well as other factors, may be considered in the determining of the time-frequency resource assignment for the MS. Based on a consideration of various factors, the BS may assign some, all, or none of the MS's request, force the MS to wait, and so on. If the BS makes an assignment of the time-frequency resources, then the BS may transmit an indication of a channel tree index of a channel tree node corresponding to the time-frequency resource assignment to the MS using a control channel (block 1720).

Figure 18:
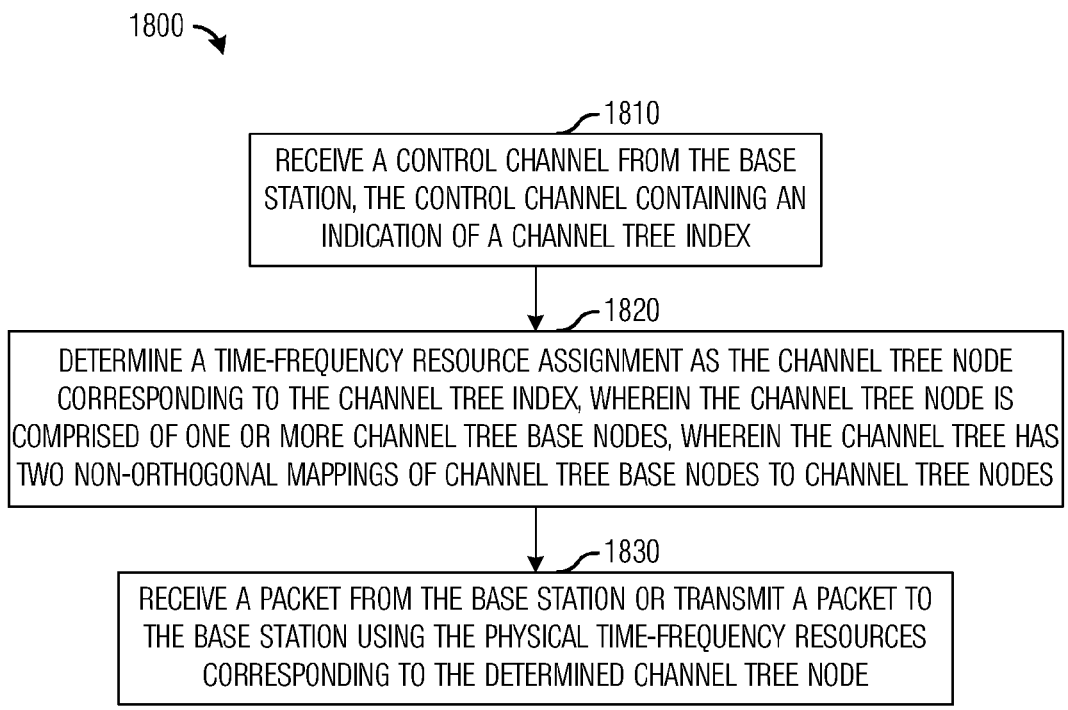
FIG. 18 is a diagram of a sequence of events in operating a mobile station.

FIG. 18 illustrates a sequence of events 1800 for MS operation. The sequence of events 1800 may be descriptive of events occurring in a MS as the MS receives an assignment of time-frequency resources from a BS. The sequence of events 1800 may begin with the MS receiving a control channel transmission from the BS, the control channel transmission may contain an indication of a channel tree index (block 1810). As discussed previously, the indication of a channel tree index may be an assignment of time-frequency resources made by the BS for the MS in response to a request for bandwidth made by the MS.

After receiving the channel tree index, the MS may determine a time-frequency resource assignment corresponding to the channel tree index (block 1820). The MS may be able to determine the time-frequency resource assignment by determining a channel tree node corresponding to the channel tree index and from the channel tree node, the MS may be able to determine the time-frequency resources assigned to it. The channel tree may be comprised of one or more channel tree base nodes and a number of channel tree nodes, and the channel tree has two non-orthogonal mappings of channel tree base nodes to channel tree nodes. The MS may need to have knowledge of a channel tree used by the BS as it made its time-frequency resource assignment. This may be accomplished by having a copy of the channel tree stored at the MS. Alternatively, the MS may have a number of channel trees stored and the channel tree used by the BS in its time-frequency resource assignment may be indicated by one or more of the following factors: traffic type, region permutation, and so forth. After determining the time-frequency resource assignment (block 1820), the MS may receive a packet from the BS or transmit a packet to the BS using physical time-frequency resources that correspond to logical time-frequency resources associated with the channel tree node assigned to the MS (block 1830).

Figure 19:
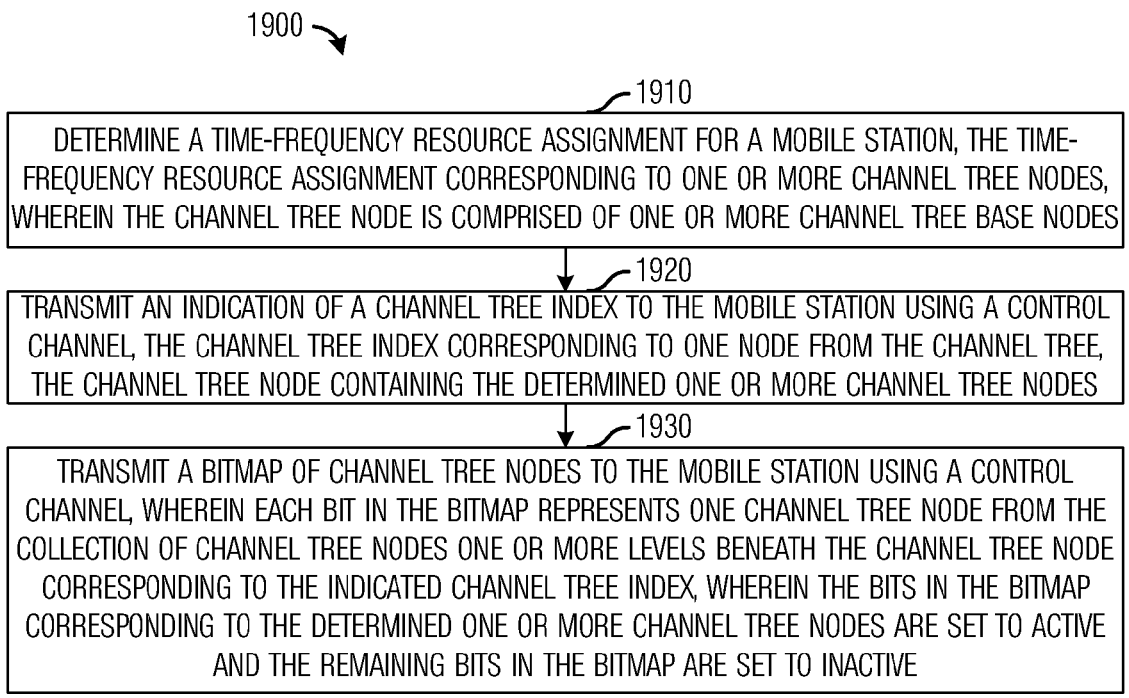
FIG. 19 is a diagram of a sequence of events in operating a base station.

FIG. 19 illustrates a sequence of events 1900 for BS operation. The sequence of events 1900 may be descriptive of events occurring in a BS as the BS determines an assignment of time-frequency resources for a MS and may be an implementation of block 1659 (FIG. 16a), wherein the BS makes an assignment of time-frequency resources to the MS. The sequence of events 1900 may begin with the BS determining a time-frequency resource assignment for a MS (block 1910). The time-frequency resource assignment may correspond to a selection of a channel tree node, wherein the channel tree node is comprised of one or more channel tree base nodes. The time-frequency resource assignment may also correspond to a selection of a set of channel tree nodes from the one or channel tree nodes associated with channel tree node selected by the BS. The BS may then transmit an indication of a channel tree index, which may correspond to the channel tree node selected above (block 1920). After transmitting the indication of the channel tree index (block 1920), the BS may then transmit a bitmap corresponding to the set of channel tree base nodes to the MS using the control channel (block 1930). Each bit in the bitmap may represent one channel tree node of the one or more channel tree nodes associated with the channel tree node selected by the BS, with a value of a bit being an indicator of an assignment status for a channel tree node represented by the bit.

Figure 20:
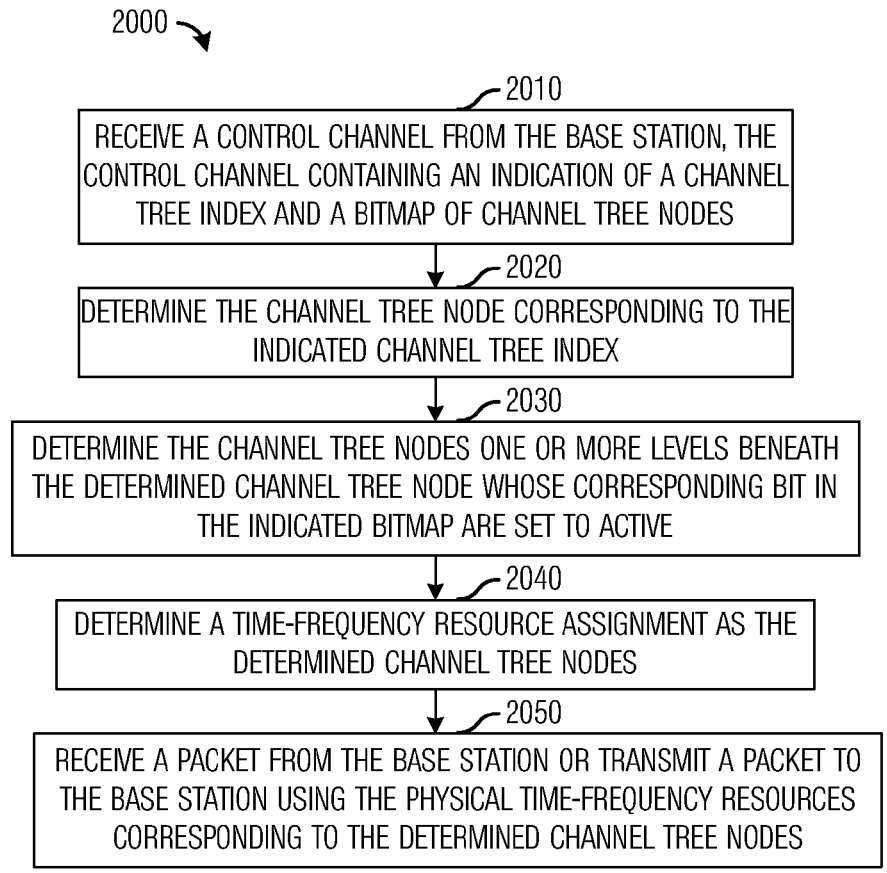
FIG. 20 is a diagram of a sequence of events in operating a mobile station.

FIG. 20 illustrates a sequence of events 2000 for MS operation. The sequence of events 2000 may be descriptive of events occurring in a MS as the MS receives an assignment of time-frequency resources from a BS. The sequence of events 2000 may begin with the MS receiving a control channel transmission from the BS, the control channel transmission may contain an indication of a channel tree index and a bitmap of channel tree nodes (block 2010). The MS may then determine a channel tree node corresponding to the channel tree index received from the BS (block 2020).

The MS may then process the bitmap received from the BS (block 2030). The MS may determine channel tree nodes specified to be active by the bitmap received from the BS. The channel tree nodes may be at a number of levels below the channel tree node corresponding to the channel tree index, wherein the number of levels may be dependent on a length of the bitmap. The MS may then determine an assignment of time-frequency resources as made by the BS in the form of the channel tree index and the bitmap (block 2040). After determining the time-frequency resource assignment (block 2040), the MS may receive a packet from the BS or transmit a packet to the BS using physical time-frequency resources that correspond to logical time-frequency resources associated with the channel tree node assigned to the MS (block 2050).

Figure 21:
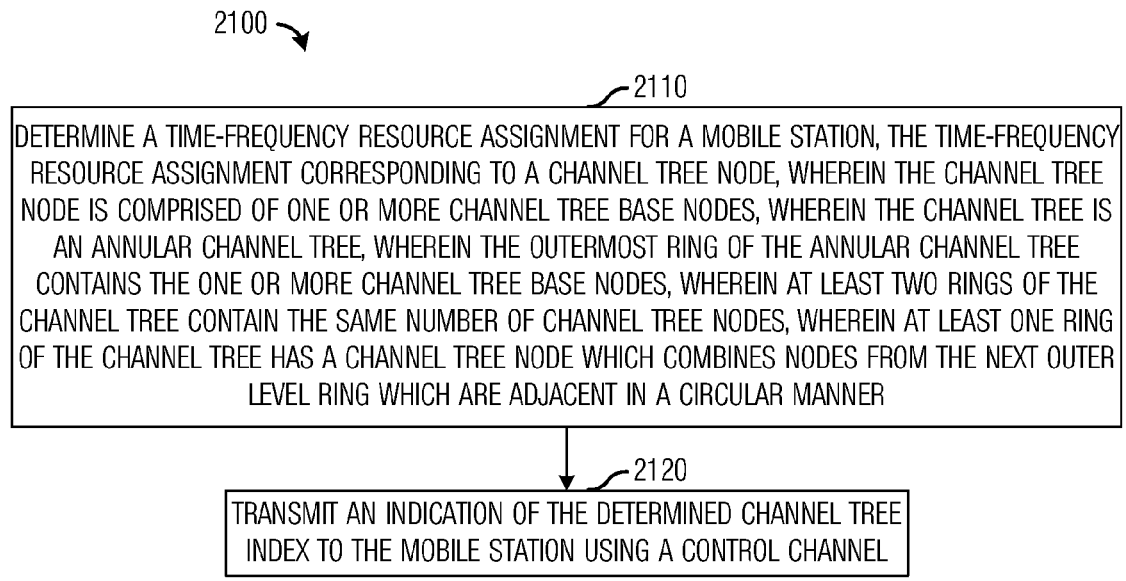
FIG. 21 is a diagram of a sequence of events in operating a base station.

FIG. 21 illustrates a sequence of events 2100 for BS operation. The sequence of events 2100 may be descriptive of events occurring in a BS as the BS determines an assignment of time-frequency resources for a MS and may be an implementation of block 1659 (FIG. 16a), wherein the BS makes an assignment of time-frequency resources to the MS. The sequence of events 2100 may begin with the BS determining a time-frequency resource assignment for a MS (block 2110). The time-frequency resource assignment may correspond to a channel tree node of an annular channel tree, wherein the channel tree node is comprised of one or more channel tree base nodes. An outermost ring of the annular channel tree contains one or more channel tree base nodes. The annular channel tree also includes at least two rings with a number of channel tree nodes, wherein the number of channel tree nodes in each ring may be equal to a number of channel tree base nodes. The annular channel tree may also have at least one ring of channel tree nodes that combines nodes from a next outer level ring of channel tree nodes that are adjacent in a circular manner. After determining the assignment of time-frequency resources, the BS may transmit an indication of the channel tree node (in the form of a channel tree index) to the MS over a control channel (block 2120).

Figure 22:
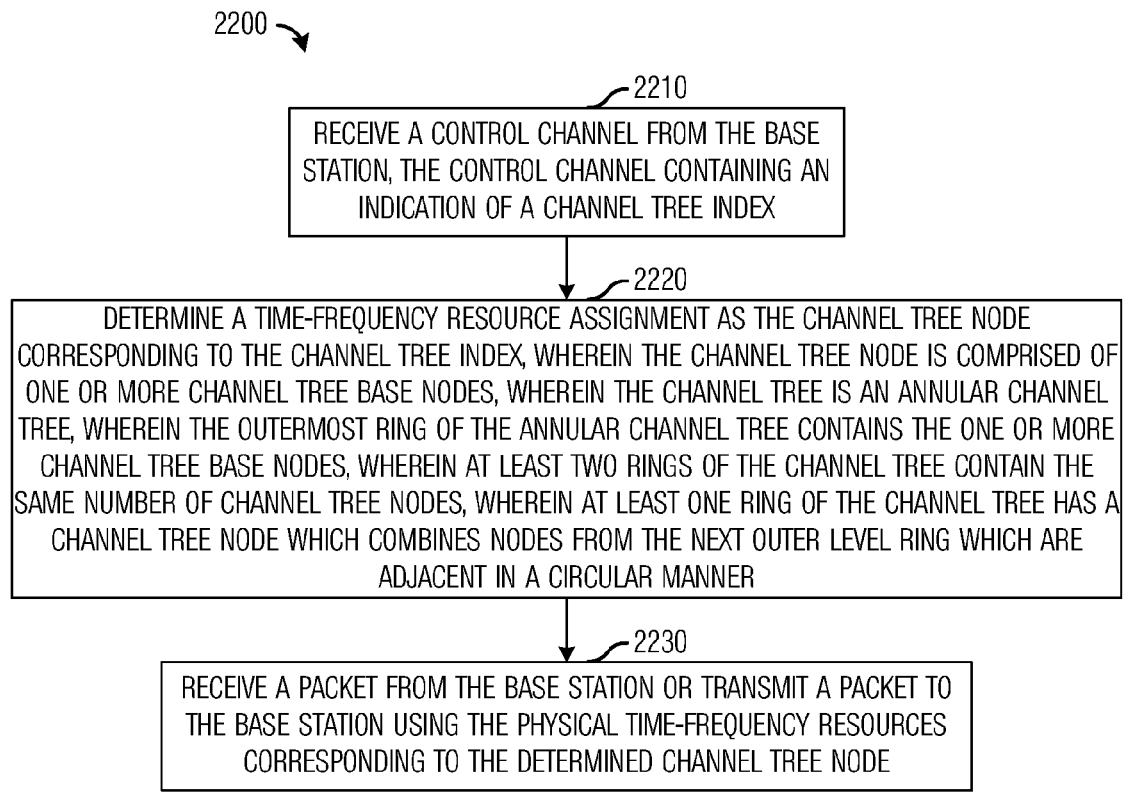
FIG. 22 is a diagram of a sequence of events in operating a mobile station.

FIG. 22 illustrates a sequence of events 2200 for MS operation. The sequence of events 2200 may be descriptive of events occurring in a MS as the MS receives an assignment of time-frequency resources from a BS. The sequence of events 2200 may begin with the MS receiving a control channel transmission from the BS, the control channel transmission may contain an indication of a channel tree index (block 2210). The MS may then determine a time-frequency resource assigned using the channel tree index (block 2220). The channel tree index may correspond to a channel tree node that may be comprised of one or more channel tree base nodes of an annular channel tree. The annular channel tree includes an outermost ring having one or more channel tree base nodes, at least one ring of the annular channel tree has a channel tree node that may combine nodes from a next outer level ring that are adjacent in a circular manner. After determining the time-frequency resource assignment (block 2220), the MS may receive a packet from the BS or transmit a packet to the BS using physical time-frequency resources that correspond to logical time-frequency resources associated with the channel tree node assigned to the MS (block 2230).

Figure 23:
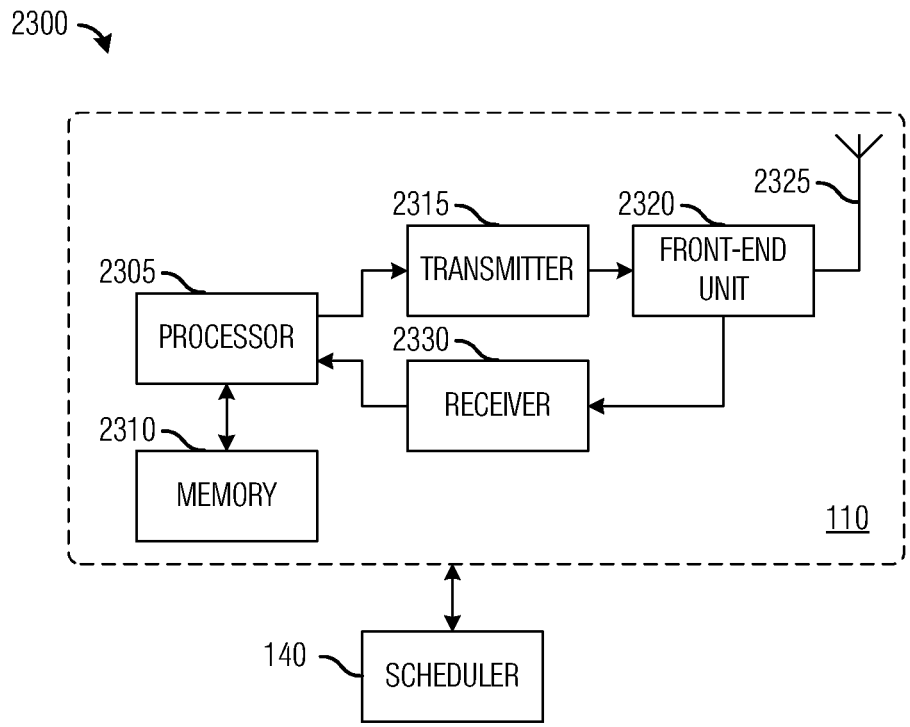
FIG. 23 is a diagram of a base station and a scheduler.

FIG. 23 illustrates a detailed view of a communications device 2300 for use in controlling the operation of a wireless communications network, such as an OFDMA wireless communications network. The communications device 2300 may include a BS 110 and a scheduler 140. The BS 110 may be used to coordinate communications for a number of MS operating in the wireless communications network, as well, as allowing communications between multiple MS and between an MS and the BS. The scheduler 140 may be used in the assigning of radio resources, enabling a sharing of a common communications medium. For example, the BS 110 may provide a time-frequency resource request to the scheduler 140 and the scheduler 140 may return a channel tree node satisfying the time-frequency resource request or a flag indicating that the time-frequency resource request may not be satisfied.

The BS 110 may include a processor 2305 that may be used to process signals to be transmitted and/or signals received. The processor 2305 may also be used to execute applications, etc. For example, the processor 2305 may execute applications that may be needed to coordinate transmissions by MS in communications with the BS 110. This may help maximize radio resource sharing while minimizing transmission collisions, errors, and so on. Depending on embodiment, the processor 2305 may be implemented as several different processors, such as a digital baseband processor and/or a general purpose processor. The processor 2305 may store data, information, applications, and so forth, in a memory 2310. The processor 2305 may provide data to be transmitted to a transmitter 2315 that may process the data for transmission, which may include encoding, spreading, mixing, filtering, interleaving, and so forth. The data processed for transmission may then be provided to a front-end unit 2320, which may include filters, duplexers, transmit/receive switches, signal amplifiers, and so forth. An antenna (or antennas) 2325 may then transmit the data over-the-air.

In addition to transmitting the data, the antenna 2325 may also receive data. Depending on embodiment, separate antennas may be used for transmission and reception, or the antenna 2325 may be shared. Received data detected by the antenna 2325 may be provided to the front-end unit 2320 where it may be filtered, amplified, and so on. A receiver 2330 may then be provided the received signal, wherein the receiver 2330 may process the received signal to produce data usable by the processor 2305. The receiver 2330 may be used to perform operations such as error detection and correction, filtering, despreading, down-conversion, and so forth.

Figure 24:
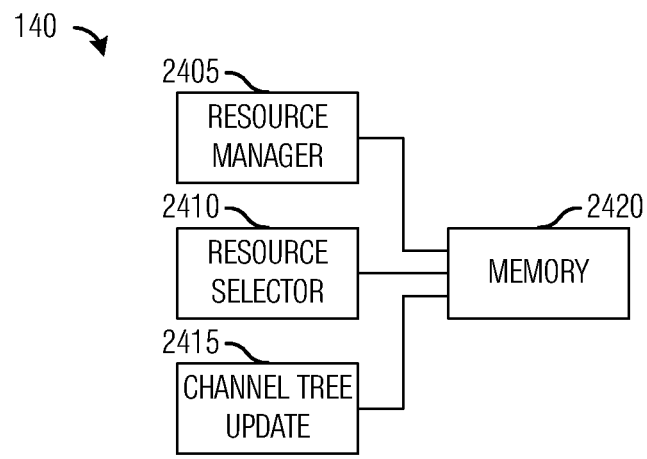
FIG. 24 is a diagram of a detailed view of a scheduler.

FIG. 24 illustrates a detailed view of a scheduler 140. As discussed previously, the scheduler 140 may be used to assign radio resources, such as, time-frequency resources, to MS requesting resources for transmitting and/or receiving information. The scheduler 140 may include a resource manager 2405. The resource manager 2405 may be used to maintain information on available radio resources, such as, time-frequency resources. The resource manager 2405 may keep track of which radio resources have been assigned for use, how long have they been assigned, when they will become free, and so forth. Furthermore, when the BS decides to service a time-frequency resource request, the resource manager 2405 may be used to find unassigned time-frequency resources that fulfill the time-frequency resource request.

The scheduler 140 may also include a resource selector unit 2410. The resource selector unit 2410 may select a channel tree node corresponding to one or more channel tree base nodes that fulfill the time-frequency resource request. The resource selector unit 2410 may select the channel tree node from information provided by the resource manager 2405. The resource selector unit 2410 may use techniques to help attain performance goals, such as reduce fragmentation of the time-frequency resources, maximize time-frequency resource utilization, utilization of available bandwidth, maximize a number of MS time-frequency resource requests, minimize time-frequency resource request wait time, and so forth. Attaining some of the above listed goals may make it not possible to attain some of the other listed goals. The resource selector unit 2410 may have the capability of selecting which goals to maximize.

The scheduler 140 may also include a channel tree update unit 2415. The channel tree update unit 2415 may be used to update the state of the channel tree based on assignments of time-frequency resources made by the resource selector unit 2410. For example, if the resource selector unit 2410 assigns a channel tree node, then the channel tree update unit 2415 may mark the channel tree node as being assigned, thereby preventing the resource manager 2405 from selecting the channel tree node as a possible assignment to satisfy a time-frequency resource request.

The resource manager 2405, the resource selector 2410, and the channel tree update unit 2415 may be coupled to a memory 2420. The memory 2420 may be used to store the channel tree, possible assignments that satisfy a time-frequency resource request, current time-frequency resource assignments, current time-frequency resource assignment expiration times, additional channel trees that may be used by the BS, and so forth.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a base station of a wireless communications system, the method comprising:
   receiving a resource request for radio resources for a mobile station;
   assigning radio resources to the mobile station in accordance with the resource request, wherein assigning radio resources comprises assigning one or more mappings of a channel tree comprising at least a first set of mappings of radio resources and a second set of mappings of radio resources, wherein at least one mapping in the second set of mappings of radio resources is non-orthogonal to another mapping in the second set of mappings of radio resources such that multiple mappings within the second set of mappings allocate a common radio resource upon being assigned; setting values of individual bits in a bitmap based on the resource request, wherein bits in the bitmap indicate an assignment state for nodes in the channel tree, and wherein a bit in the bitmap corresponds to a single node of the channel tree; and
   transmitting the bitmap to the mobile station.

2. The method of claim 1, wherein the first set of mappings of radio resources comprises a multilevel tree configuration having K levels, wherein a first level comprises a single node, an N-th level comprises N*M nodes, where M is a degree of the channel tree, and a K-th level comprises nodes representing allocatable radio resources, with a node of a second level coupled to M nodes of a third level immediately below the second level, with each node representing a mapping between the node and radio resources coupled to the node, and wherein the second set of mappings of radio resources comprises one or more list nodes, with each list node associated with one or more radio resources.

3. The method of claim 2, wherein the assigning comprises selecting a node of the channel tree or a list node based on the resource request, and wherein the bitmap comprises an index of the selected node of the channel tree or the selected list node, the index being a numerical value.

4. The method of claim 2, wherein the radio resources associated with a list node of the second set of mappings may have one of two values, a first value representing that the radio resource is assigned to the resource request and a second value representing that the radio resource is not assigned to the resource request.

5. The method of claim 1, further comprising transmitting information to the mobile station using the assigned radio resources or receiving information from the mobile station using the assigned radio resources.

6. The method of claim 1, further comprising prior to the base station returning to normal operations, discarding the resource request.

7. The method of claim 1, wherein the channel tree comprises a multilevel channel tree that is specifiable by a first index corresponding to a node in a first portion of the multilevel channel tree and a second index corresponding to a number of nodes a specified number of levels below the node corresponding to the first index, and
   wherein assigning radio resources to the mobile station comprises:
      selecting a node from the first level to a K-(LogMJ) level of the multilevel channel tree based on the resource request; and
      setting values of individual bits in the bitmap based on the resource request, wherein bits in the bitmap indicate an assignment state for nodes in a level LogMJ levels below a level of the selected node, and wherein a bit in the bitmap corresponds to a single node of the multilevel channel tree at the level LogMJ levels below a level of the selected node.

8. The method of claim 1, wherein at least two mappings within the second set of mappings allocate common radio resources upon being assigned.

9. The method of claim 1, wherein all mappings in the second set of mappings are mapped to the common node.

10. A method for operating a base station of a wireless communications system, the method comprising:
receiving a resource request for radio resources for a mobile station;
assigning radio resources to the mobile station by assigning at least one node of an annular channel tree to the mobile station, the annular channel tree comprising an outermost ring having a plurality of base nodes corresponding to allocatable radio resources, two or more intermediate rings each having a same number of nodes as the outermost ring, and an innermost ring having a single node, wherein nodes of the annular channel tree are mapped to one another such that the outermost ring, the two or more intermediate rings, and the innermost ring are interconnected in a circularly adjacent manner, wherein at least one of the nodes on an outer-most one of the two or more intermediate rings is non-orthogonal with another one of the nodes on the outer-most intermediate ring such that multiple nodes on the outer-most intermediate ring allocate a common time-frequency resource upon being assigned;
setting values of individual bits in a bitmap based on the resource request, wherein bits in the bitmap indicate an assignment state for nodes in the channel tree, and wherein a bit in the bitmap corresponds to a single node of the channel tree; and
transmitting the bitmap to the mobile station.

11. The method of claim 10, wherein the assigning comprises selecting a node of the annular channel tree based on the resource request.

12. The method of claim 11, wherein the bitmap comprises an index of the selected node.

13. The method of claim 10, wherein at least one of the nodes on an outer-most one of the two or more intermediate rings is non-orthogonal with another one of the nodes on the outer-most intermediate ring such that multiple nodes on the outer-most intermediate ring are associated with the common time-frequency resource.

14. The method of claim 10, wherein multiple nodes on the first inner ring allocate the common radio resource upon being assigned.

15. A method for operating a base station of a wireless communications system, the method comprising:
receiving a resource request for radio resources for a mobile station;
assigning radio resources based on the resource request, wherein the assigning makes use of a multilevel channel tree comprising a set of mappings between nodes of the multilevel channel tree and radio resources, with each node corresponding to at least one radio resource, the multilevel channel tree specifiable by a first index corresponding to a node in a first portion of the multilevel channel tree and a second index corresponding to a number of nodes a specified number of levels below the node, and
transmitting an indicator of the assigned radio resources to the mobile station,
wherein the multilevel channel tree has K levels, a first one of the K levels comprising a single node, an N-th one of the K levels comprising N*M nodes, where M is a degree of the multilevel channel tree, and a K-th one of the K levels comprising nodes representing allocatable radio resources,
wherein the second index comprises a J-bit long bitmap, and wherein the assigning comprises:
selecting a node from the first level to a K-(LogMJ) level of the multilevel channel tree based on the resource request; and
setting values of individual bits in the bitmap based on the resource request, wherein bits in the bitmap indicate an assignment state for nodes in a level LogMJ levels below a level of the selected node, and wherein a bit in the bitmap corresponds to a single node of the multilevel channel tree at the level LogMJ levels below a level of the selected node.

16. The method of claim 15, wherein the index comprises the first index and the second index.

17. The method of claim 15, wherein the number of levels is dependent on a length of the second index.

18. A base station comprising:
a processor: and
a computer readable storage medium storing programming for execution by the processor, the programming including instructions to:
receive a resource request requesting radio resources for a mobile station;
assign radio resources to the mobile station based on the resource request using a channel tree comprised of at least a first set of mappings of radio resources and a second set of mappings of radio resources, wherein at least one mapping in the second set of mappings of radio resources is non-orthogonal to another mapping in the second set of mappings of radio resources such that multiple mappings within the second set of mappings allocate a common radio resource upon being assigned;
set values of individual bits in a bitmap based on the resource request, wherein bits in the bitmap indicate an assignment state for nodes in the channel tree, and wherein a bit in the bitmap corresponds to a single node of the channel tree; and
transmit the bitmap to the mobile station.

19. The base station of claim 18, wherein the programming further includes instructions to:
update radio resources information by marking the assigned radio resources as being assigned.

20. The base station of claim 18, wherein the channel tree comprises a multilevel channel tree that is specifiable by a first index corresponding to a node in a first portion of the multilevel channel tree and a second index corresponding to a number of nodes a specified number of levels below the node corresponding to the first index, and
wherein assigning radio resources to the mobile station comprises:
selecting a node from the first level to a K-(LogMJ) level of the multilevel channel tree based on the resource request; and
setting values of individual bits in the bitmap based on the resource request, wherein bits in the bitmap indicate an assignment state for nodes in a level LogMJ levels below a level of the selected node, and wherein a bit in the bitmap corresponds to a single node of the multilevel channel.

21. The base station of claim 18, wherein at least two mappings within the second set of mappings allocate common radio resources upon being assigned.

22. The base station of claim 18, wherein all mappings in the second set of mappings are mapped to the common node.

23. A base station comprising:

a processor: and a computer readable storage medium storing programming for execution by the processor, the programming including instructions to:

receive a resource request for radio resources for a mobile station;

assign radio resources to the mobile station in accordance with the resource request using an annular channel tree comprising an outermost ring and a first inner ring, wherein the outermost ring comprises a plurality of base nodes corresponding to radio resources, and wherein the first inner ring comprises a first plurality of intermediate nodes each of which being mapped to one or more base nodes of the outermost ring, wherein at least one of the first plurality of intermediate nodes on the first inner ring is non-orthogonal to another one of the first plurality of intermediate nodes on the first inner ring such that multiple nodes within the first plurality of intermediate nodes allocate a common radio resource upon being assigned;

set values of individual bits in a bitmap based on the resource request, wherein bits in the bitmap indicate an assignment state for nodes in the channel tree, and wherein a bit in the bitmap corresponds to a single node of the channel tree; and transmit the bitmap to the mobile station.

24. The base station of claim 23, wherein a number of intermediate nodes on the first inner ring is the same as a number of base nodes on the outermost ring.

25. The base station of claim 23, wherein the annular channel tree further comprises a second inner ring comprising a second plurality of intermediate nodes each of which being mapped to one or more of the first plurality of intermediate nodes of the first inner ring, and wherein a number of intermediate nodes on each of the first inner ring and the second inner ring is the same as a number of base nodes on the outermost ring.

26. The base station of claim 23, wherein the first plurality of intermediate nodes are mapped to one or more base nodes of the outermost ring such that the outermost ring and the first inner ring are interconnected in a circularly adjacent manner.

27. The base station of claim 23, wherein multiple nodes on the first inner ring allocate the common radio resource upon being assigned.

* * * * *